(12) United States Patent
Iino

(10) Patent No.: US 7,252,258 B2
(45) Date of Patent: Aug. 7, 2007

(54) RECORDING TAPE CARTRIDGE

(75) Inventor: Wataru Iino, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 368 days.

(21) Appl. No.: 11/028,066

(22) Filed: Jan. 4, 2005

(65) Prior Publication Data

US 2005/0145737 A1   Jul. 7, 2005

(30) Foreign Application Priority Data

Jan. 7, 2004   (JP)   ............................. 2004-002216

(51) Int. Cl.
*G11B 23/07*   (2006.01)
(52) U.S. Cl. .................. 242/348; 242/610.4; 242/611; 360/132
(58) Field of Classification Search ................ 242/348, 242/348.2, 610.4, 610.6, 611; 360/132
See application file for complete search history.

(56) References Cited

FOREIGN PATENT DOCUMENTS

| JP | 63-251983 A | 10/1988 |
|---|---|---|
| JP | 3187022 B2 | 7/2001 |

*Primary Examiner*—John Q. Nguyen
(74) *Attorney, Agent, or Firm*—Sughrue Mion, PLLC

(57) ABSTRACT

A recording tape cartridge which can be loaded into a drive device having a reel on which a recording tape is wound and which is rotatably accommodated in a case, the reel including: a resin-formed main portion which includes a reel hub formed in a tubular shape having a floor, the recording tape being wound around an outer peripheral surface of the reel hub; and a substantially disc-shaped metal plate attached firmly to an outer surface of a floor portion of the reel hub, wherein a gate portion, through which a resin material is introduced at the time of molding the main portion, is provided at a radial direction outer side of the metal plate.

13 Claims, 14 Drawing Sheets

RECORDING TAPE CARTRIDGE

CROSS-REFERENCE TO RELATED APPLICATION

This application claims priority under 35 USC 119 from Japanese Patent Application No. 2004-2216, the disclosure of which is incorporated by reference herein.

BACKGROUND OF THE INVENTION

1. Field of the Invention

The present invention relates to a recording tape cartridge which rotatably accommodates a reel on which a recording tape, such as a magnetic tape or the like, is wound.

2. Description of the Related Art

Recording tapes, such as magnetic tapes and the like, are used as external recording media of computers and the like. Little space is required for storage of the recording tape, and a large amount of information can be recorded thereon. A so-called single-reel recording tape cartridge is used which rotatably accommodates, within a case, a single reel on which such a recording tape is wound. (See Japanese Patent Application Laid-Open No. 63-251983 and Japanese Patent No. 3187022, for example.)

The reel, which forms the recording tape cartridge, has a resin-formed reel hub at an axial central portion thereof. The reel hub is formed in a tubular shape having a floor. A recording tape is wound on an outer peripheral portion of the reel hub. Flanges are provided at both axial end portions of the reel hub. One flange is provided integrally with the reel hub and forms a main portion of the reel. The other flange is formed as a separate component and is attached firmly to the reel hub by welding or the like.

An annular reel gear is provided on an outer surface of the floor portion of the reel hub, along an outer circumference portion of the floor portion. The reel gear is exposed to the exterior from a gear opening of the case. The reel gear meshes with the driving gear, which is formed at a rotating shaft of the drive device. When the rotating shaft is rotated while the reel gear is meshed with the driving gear, the recording tape is pulled out of the case or taken up onto the reel in the case.

A disc-shaped metal plate, made of a magnetic material, is attached firmly to the outer surface of the reel hub at an inner side of the reel gear. In the state in which the reel gear is meshed with the driving gear, the metal plate is magnetically attracted and held in a non-contact manner by a magnet provided at the rotating shaft. The attracting force keeps the reel gear and the driving gear being meshed with each other.

Known methods of firmly attaching such metal plate to the reel hub include insert molding, and welding by caulking. These methods will be described referring to drawings.

As shown in FIG. 14, at a reel 200, a metal plate 206 is firmly attached by insert molding to a floor portion 202A of a reel hub 202 at an inner side of a reel gear 204. A flange 208 extends integrally from one axial direction end portion of the reel hub 202. A through hole 210 is provided at an axial central portion of the metal plate 206. The through hole 210 is of a so-called socket-and-spigot joint shape having a large-diameter portion 210A provided at the axial end portion opposite to the floor portion 202A. Further, three through holes 212 (only one of them is illustrated) are formed in the metal plate 206 at the radial direction outer side portions of the through holes 210 along a circumference coaxially with the through holes 210. Each through hole 212 is of a socket-and-spigot joint shape having a large-diameter portion 212A.

In the reel 200, gate portions G are provided in the metal plate 206 at an inner side of the through holes 210. At the time of resin molding, a resin material, which is a molding material, is introduced through the gate portions G. In the reel 200, by pouring the resin material through the gate portions G into a mold in which the metal plate has been inserted, the reel hub 202 and the flange 208 can be formed integrally and the metal plate 206 is attached firmly to the reel 200.

In the reel 220 shown in FIG. 15, the metal plate 224 is welded by caulking to the floor portion 222A of the reel hub 222 at an inner side of the reel gear 204. A through hole 226 is provided at an axial central portion of the floor portion 222A of the reel hub 222. A braking member, which prevents rotation of the reel when the recording tape cartridge 10 is not in use, is operated from outside via the through hole 226. A plurality of caulking projections 228 is provided protruding from the outer surface of the floor portion 222A. A through hole 230 corresponding to the through hole 226, and a plurality of through holes 232 corresponding to the caulking projections 228 are formed in the metal plate 224. In the reel 220, after the reel hub 222, the flange 208 and the like are integrally formed, the caulking projections 228 are inserted in the through holes 230 of the metal plate 224. By the caulking projections 228 being caulked, the metal plate 224 is attached firmly to the floor portion 222A.

In the reel 220, the gate portions G are provided in the outer surface of the floor portion 222A between the through hole 226 and the reel gear 204. By the resin material being introduced through the gate portions G to fill the mold, the reel hub 202 and the flange 208 are integrally formed. In this way, the metal plate 224 is attached firmly to the outer surface of the floor portion 222A so that the gate portions G are covered by the metal plate 224. Although not illustrated, such a structure is also known that each through hole 232 has a large diameter portion into which the resin material enters after the caulking so that the caulking projections 228 does not project out further than the metal plate 224.

However, the structure shown in FIG. 14 has the following drawbacks. First, it is necessary to provide a relatively large through hole 210 at the axial central portion of the metal plate 206 in order to provide the gate portions G. As a result, the area of the metal plate 206 for being attracted by the magnet is made small. Second, because the gate portions G are provided utilizing the through hole 210 that passes through the metal plate 206, in the case in which, for example, a plurality of gate portions G is to be provided, it is necessary to position the metal plate 206 in a direction in which the metal plate rotates using a dedicated equipment. Third, in the case in which, for example, the gate portions G are provided at places which are offset from the axial central portion, it is necessary to position the metal plate 206 within the mold. Further, the setting for resin molding becomes complex and the metal plate 206 may often be defectively attached.

In the structure shown in FIG. 15, because the metal plate 224 is welded by caulking after the reel hub 222 is molded, inclination of the surface of the metal plate 224 often becomes inconsistent depending on conditions of caulking, and thus it is difficult to obtain surface profile accuracy of the metal plate 224. In particular, if the gate scar after the molding of the reel hub 222 remain projecting, the metal plate 224 which the gate scar is to abut often inclined. As a result, the surface profile accuracy of the metal plate 224 often cannot be kept within the tolerance.

SUMMARY OF THE INVENTION

In view of the aforementioned, an object of the present invention is to provide a recording tape cartridge in which an influence of a gate portion to a metal plate which is attached firmly to a reel hub can be suppressed.

A first aspect of the present invention is to provide a recording tape cartridge which can be loaded into a drive device comprising a reel on which a recording tape is wound and which is rotatably accommodated in a case, the reel comprising: a resin-formed main portion which includes a reel hub formed in a tubular shape having a floor, the recording tape being wound around an outer peripheral surface of the reel hub; and a substantially disc-shaped metal plate attached firmly to an outer surface of a floor portion of the reel hub, wherein a gate portion, through which a resin material is introduced at the time of molding the main portion, is provided at a radial direction outer side of the metal plate.

In the recording tape cartridge described above, the main portion of the reel including the reel hub (or may be only the reel hub) is formed by resin molding. The metal plate is attached firmly to the outer surface of the floor portion of the reel hub so as to form (a portion of) the reel.

The gate portions, through which the resin material is introduced at the time of forming the main portion of the reel, are provided on the floor portion of the reel hub at the radial direction outer side of the metal plate. Thus, the gate portions do not interfere with the metal plate. As a result, this structure has no defects such as decreasing the area of the metal plate, requiring positioning of the metal plate with respect to the reel hub, or impairing mounting accuracy of the metal plate.

Accordingly, in the recording tape cartridge described above, the effect of the gate portions on the metal plate which is attached firmly to the reel hub can be reduced.

In the first aspect, the metal plate may be attached firmly to the main portion by insert molding.

In the recording tape cartridge described above, the metal plate is attached firmly to the reel hub by insert molding. Thus, the profile accuracy of the metal plate is improved. In addition, since the gate portions are provided at the radial direction outer side of the metal plate, it is not necessary to provide through holes used for providing gate portions other than the through holes used for insert molding. Thus, the area of the metal plate is not reduced. Further, it is not necessary to position the metal plate in a direction in which the metal plate rotates within the mold so as to correspond to the gate portions. As a result, molding can be carried out easily.

Moreover, a plurality of gate portions may be provided.

In addition, the gate portions may be positioned at even intervals on a predetermined circumference which is coaxial with the reel hub.

In the recording tape cartridge described above, the plurality of gate portions is positioned at places which are spaced apart from the axial center of the reel hub (the main portion of the reel) such that the gate portions are positioned at even intervals on a predetermined circumference which is coaxial with the reel hub. Thus, the flow of the resin material is well-balanced. Hence, the setting for resin molding can be carried out with ease and the molding accuracy of (the main portion of) the reel can be improved.

In addition, the reel may further include an annular reel gear, which is formed on an outer side of the metal plate at the outer surface of the floor portion of the reel hub and which can mesh with a driving gear of the drive device, and wherein the gate portion is provided at the region where the reel gear is formed.

In the recording tape cartridge described above, the gate portion is provided at the region where the reel gear is formed on the floor portion of the reel hub. Generally, the reel gear is formed at a thickened region of the floor portion. The gate portion is formed at such a thick portion. Therefore, the pressure is kept at the region where the reel gear is formed during the period at which the introduced resin material is cooled and cured. Thus, shrinkage caused by shrinkage of the region where the reel gear is formed can be prevented, and the molding accuracy of the reel gear is improved.

A second aspect of the present invention is to provide a reel around which a recording tape is wound, the reel comprising: a resin-formed reel hub formed in a tubular shape having a floor, the recording tape being wound around an outer peripheral surface of the reel hub; a lower flange having a diameter larger than that of the reel hub, the lower flange being provided integrally with a floor portion of the reel hub and forming a main portion of the reel; an upper flange having a diameter substantially equal to that of the lower flange, the upper flange being provided at a top end portion, opposite to the floor portion, of the reel hub; and a substantially disc-shaped metal plate attached firmly to an outer surface of the floor portion of the reel hub, wherein a gate portion, through which a resin material is introduced at the time of molding the main portion, is provided at a radial direction outer side of the metal plate.

A third aspect of the present invention is to provide a method of manufacturing a reel using a metal mold having a first mold and a second mold, the reel including a resin-formed main portion including a reel hub formed in a tubular shape having a floor, a recording tape being wound around an outer peripheral surface of the reel hub, the method comprising: placing a substantially disc-shaped metal plate in a concave portion of the first mold that corresponds to an outer surface of a floor portion of the reel hub; closing the metal mold with the first and the second molds abutting each other; and forming the main portion by introducing a resin material through a gate portion into a cavity formed by the first and second molds, wherein the gate portion, through which the resin material is introduced at the time of molding the main portion, is provided at a radial direction outer side of the metal plate.

DESCRIPTION OF THE PREFERRED EMBODIMENTS

Hereinafter, a recording tape cartridge 10 relating to an embodiment of the present invention will be described on the basis of FIGS. 1 through 10. First, the basic, overall structure of the recording tape cartridge 10, the structures of an opening and a door, and the structures of a reel and a braking mechanism will be described. Then, the molding structure of a reel 14, which is a main portion of the present invention will be described. Note that, for convenience of explanation, the direction of loading the recording tape cartridge 10 into a drive device, which is denoted by arrow A, is the forward direction (front side) of the recording tape cartridge 10. Further, the direction of arrow B, which is orthogonal to arrow A, is the rightward direction.

Overall Structure of Recording Tape Cartridge

Figure 1:
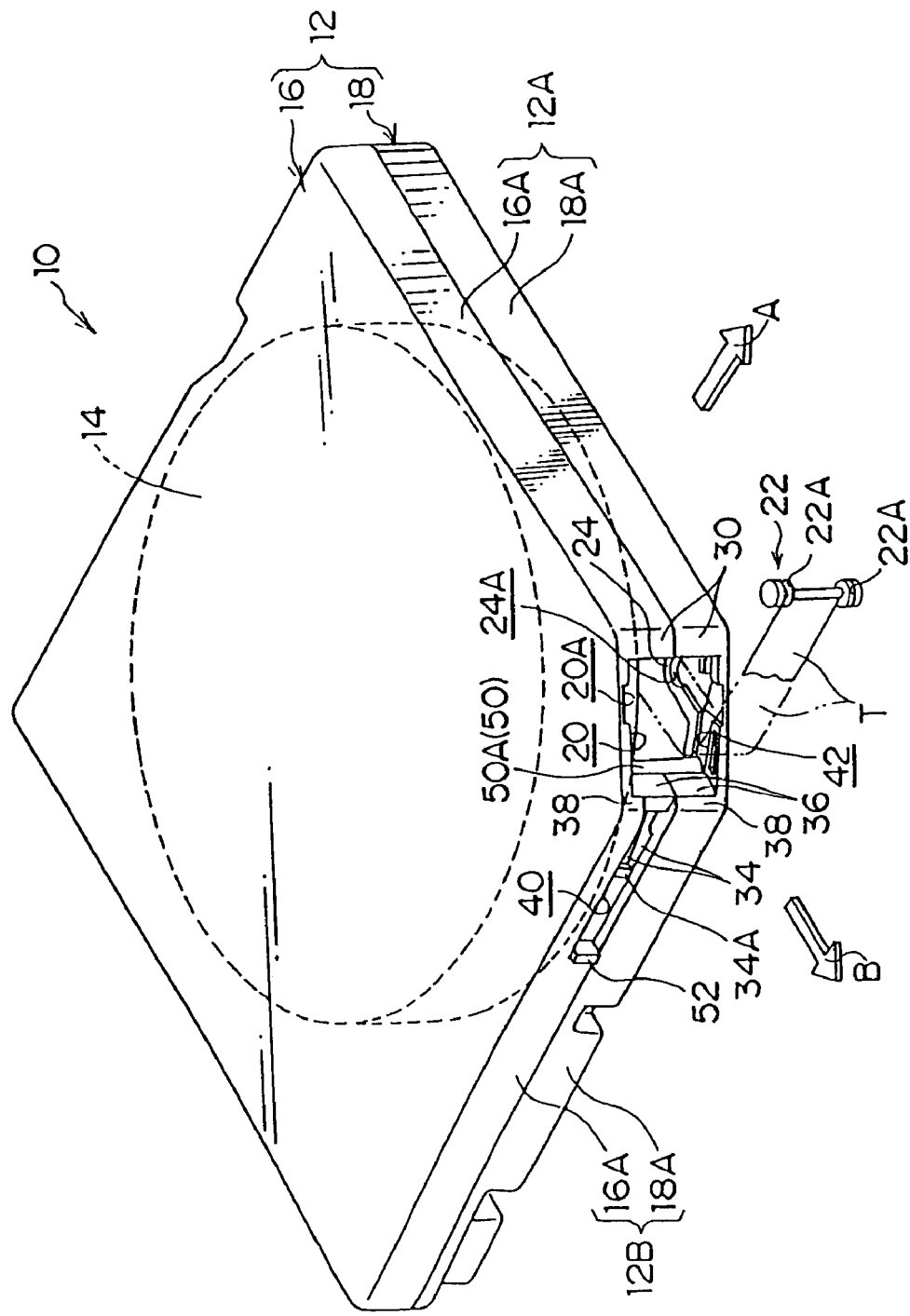
FIG. 1 is a perspective view of an overall structure of a recording tape cartridge relating to an embodiment of the present invention.
Figure 2:
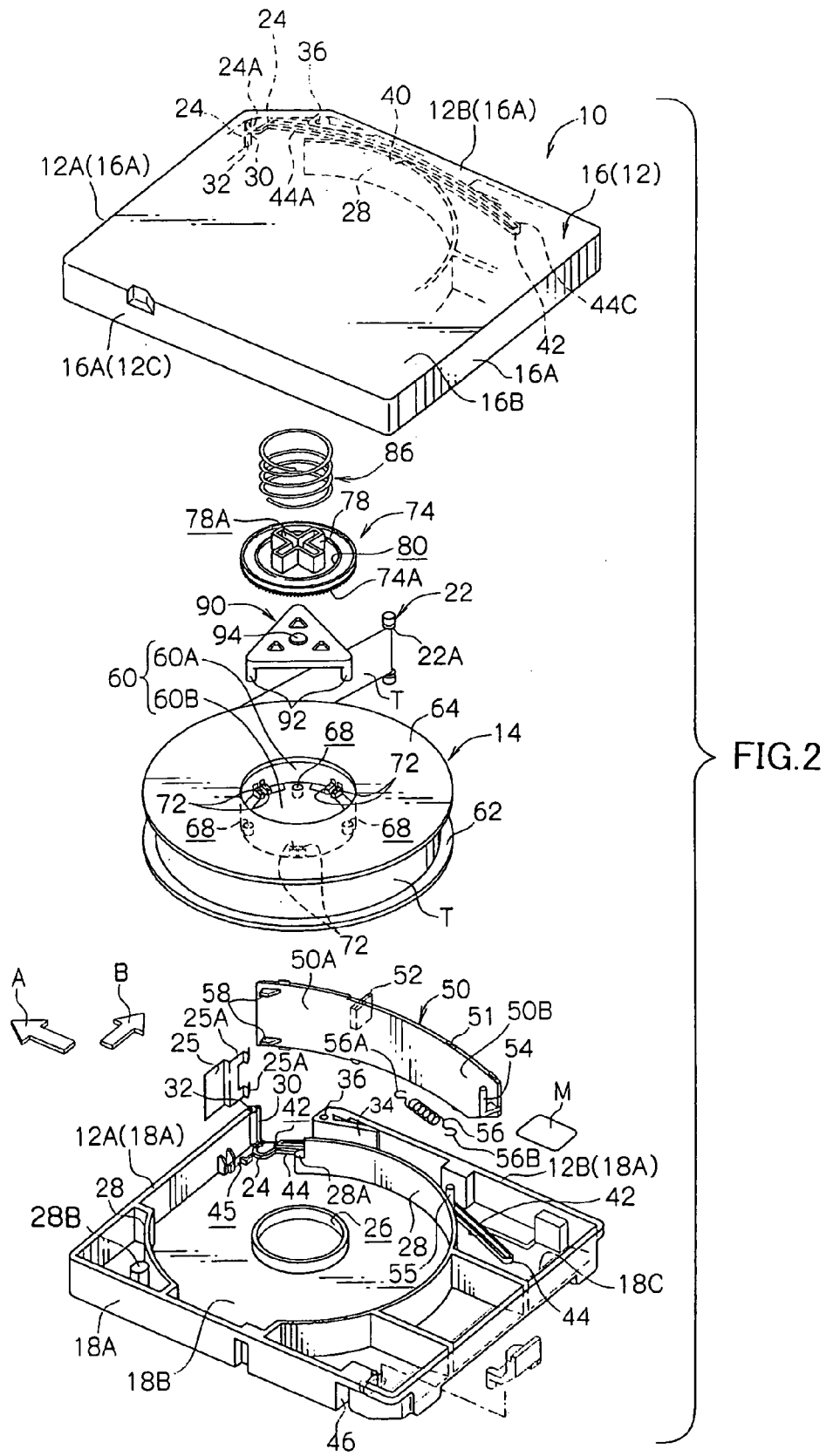
FIG. 2 is a exploded perspective view of the recording tape cartridge relating to the embodiment.

The overall structure of the recording tape cartridge 10 is shown in perspective view in FIG. 1. A schematic exploded perspective view of the recording tape cartridge 10 is shown in FIG. 2. As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut away. A space for accommodating the reel 14, on which the magnetic tape T is wound, is provided at the interior of the case 12. The corner portion of the upper case 16 and the lower case 18, at which corner portion the peripheral walls 16A, 18A, a ceiling plate 16B and a floor plate 18B have been cut away, forms an opening 20 which is for pulling-out of the magnetic tape T. The detailed structures of the opening 20 and a door 50, which opens and closes the opening 20, will be described later.

A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

A pair of upper and lower pin stands 24, which position and hold the leader pin 22 within the case 12, are provided at the inner side of the opening 20 of the case 12. The pin stands 24 are formed in semi-cylindrical shapes which open in the direction of arrow B. Both end portions of the leader pin 22, which is in a state of standing upright, are held in concave portions 24A of the pin stands 24. The pin stands 24 are continuous with ribs 44 which will be described later.

A plate spring 25 is fixed in the vicinity of the pin stands 24. The plate spring 25 engages the upper and lower end portions of the leader pin 22, and holds the leader pin 22 at the pin stands 24. When the leader pin 22 enters into and exits out from the pin stands 24, arm portions 25A of the plate spring 25 are appropriately elastically deformed, such that movement of the leader pin 22 is permitted.

Further, a gear opening 26, which serves as an opening for exposing a reel gear 66 (which will be described later) of the reel 14 to the exterior, is formed in the central portion of the lower case 18. An annular rib 26A, for positioning the reel 14, projects toward the inner side of the case 12 at the edge portion of the gear opening 26. Moreover, play restricting walls 28 are provided to project out at portions of the inner surfaces of the upper case 16 and the lower case 18, and which serve as inner walls which are on a circular locus which is coaxial with the gear opening 26. The reel 14 is held so as to not joggle by the play restricting walls 28.

A hollow portion 28A, in which a hole for position regulation is formed, is continuous with the end portion of the play restricting wall 28 in a vicinity of the opening 20. Further, a hollow portion 28B, in which is formed a hole for position regulation which is a laterally long hole, stands erect in the space sandwiched between the front left corner portion of the case 12 and the play restricting wall 28. The hollow portions 28A, 28B are disposed on a single straight line which extends along the direction of arrow B. End portions of the play restricting walls 28, except for the end portion thereof at which the hollow portion 28A is continuous, are continuous with the peripheral wall 16A or the peripheral wall 18A of the case 12, so as to partition the outer sides of the play restricting walls 28 and the space at which the reel 14 is set.

A memory board M (see FIGS. 2 and 5), which stores various types of information, is set at the rear right portion of the lower case 18 for each recording tape cartridge 10. A portion of an inclined rear wall 18C forming the peripheral wall 18A is inclined at a predetermined angle and the memory board M is disposed so as to be inclined at a predetermined angle such that sensing is possible at a drive device, which reads information recorded on the memory board M from the bottom surface side of the case 12, and at a library device, which reads information recorded on the memory board M from the rear surface side of the case 12.

Opening, and Structure of Case in Vicinity of Opening

Figure 3:
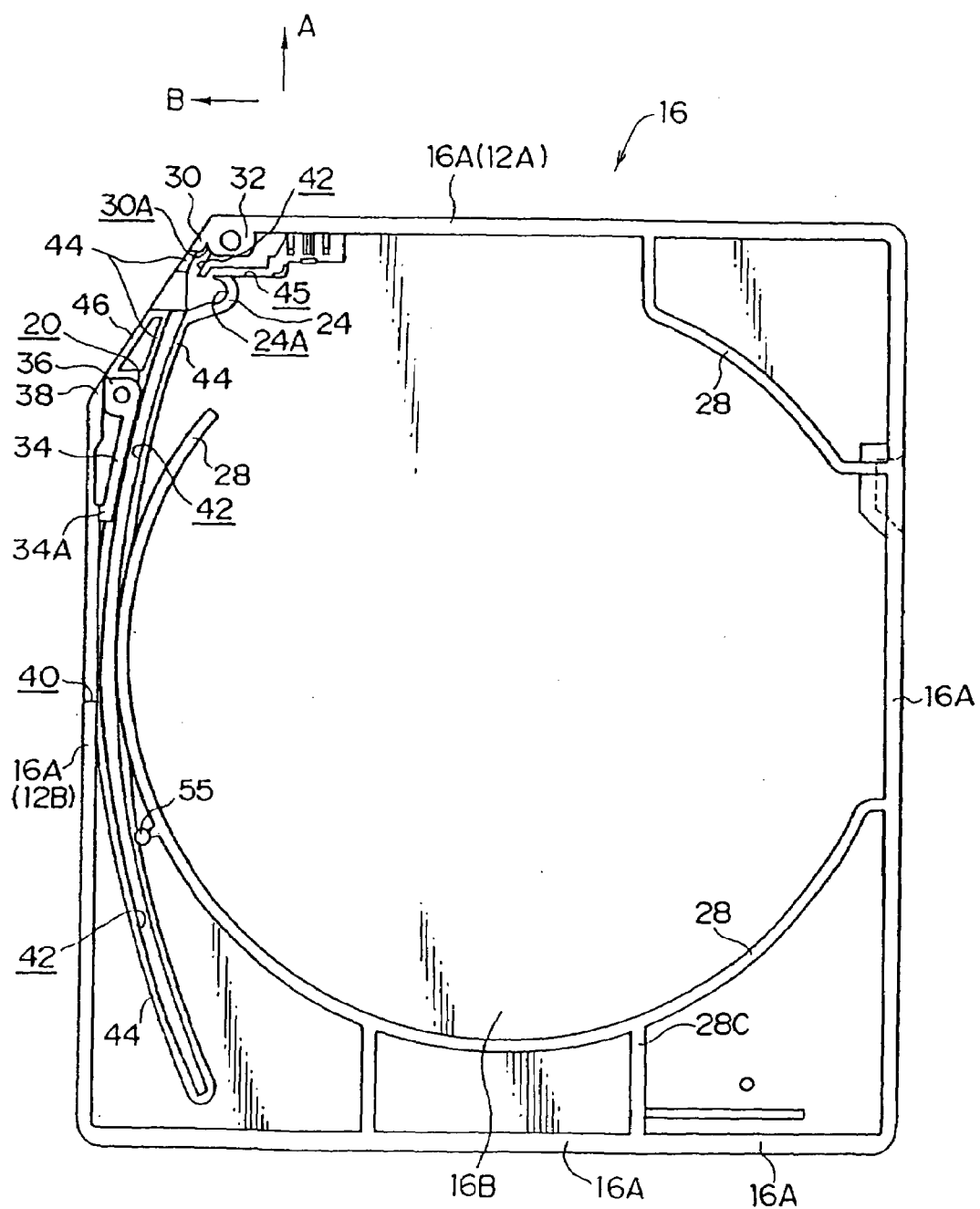
FIG. 3 is a bottom view of an upper case which forms the recording tape cartridge relating to the embodiment.
Figure 4:
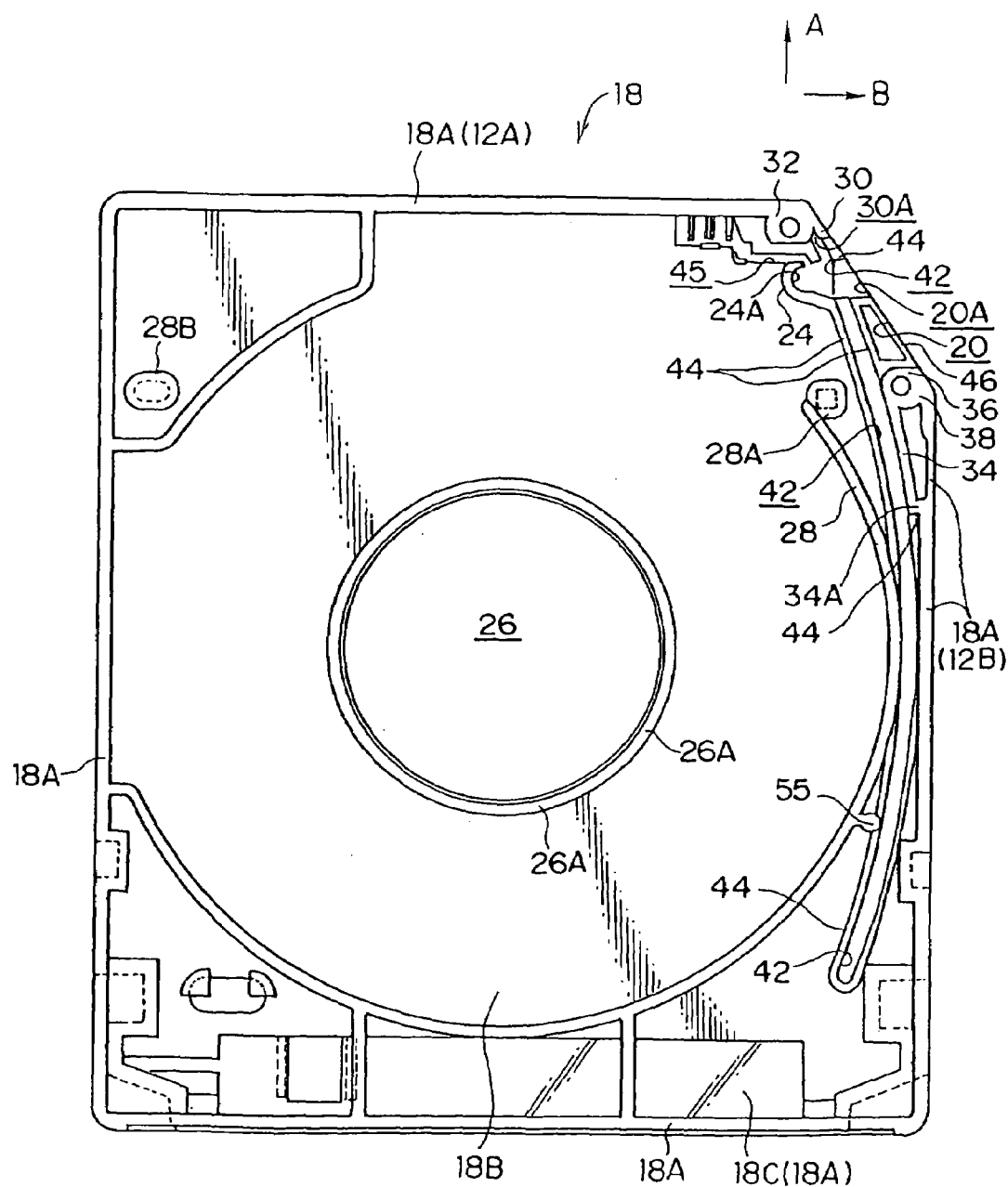
FIG. 4 is a plan view of a lower case which forms the recording tape cartridge relating to the embodiment.

As shown in FIG. 3 (which is a bottom view of the upper case 16) and in FIG. 4 (which is a plan view of the lower case 18), a pair of upper and lower screw bosses 32 and a pair of upper and lower screw bosses 36 are provided at the front and rear edge portions of the opening 20, respectively. The screw bosses 32, 36, as well as other screw bosses which are not illustrated, are for the screwing-in of screws for joining the upper case 16 and the lower case 18.

The screw bosses 32, which are positioned at the front edge portion of the opening 20, are continuous with the right end portion of a front wall 12A of the case 12 (the front wall 12A is the portions of the peripheral walls 16A, 18A whose outer surfaces are directed in the direction of arrow A), and are continuous with a pair of upper and lower dustproofing walls 30 which are short and are bent along the plane of opening of the opening 20 from the right end portion of the front wall 12A. Concave portions 30A, into which the distal end portion of the door 50 which will be described later enters, are formed between the screw bosses 32 and the dustproofing walls 30.

The screw bosses 36, which are positioned at the rear edge portion of the opening 20, are continuous with bent walls 38 and with the front end portions of a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to the outer peripheral surface of (i.e., the locus of movement of the outer peripheral surface of) the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16.

A guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a floor plate 18B of the lower case 18, the right wall 12B (either the peripheral wall 16A or the peripheral wall 18A), and the play restricting walls 28. In this way, the guide grooves 42 are formed without making the ceiling plate 16B or the floor plate 18B thinner. The ribs 44 are continuous with the pin stands 24.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the play restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the play restricting walls 28).

Further, the portion of the guide groove 42 positioned at the opening 20 is continuous with the concave portion 24A due to the rib 44 being cut-out at the right side of the pin stand 24, and is also continuous with a spring groove 45 in which the arm portion 25A of the plate spring 25 is disposed. Moreover, at the cut-out portion of the guide groove 42, a taper opening 20A, which guides the leader pin 22 into the case 12, is continuous with the concave portion 24A of the pin stand 24. In addition, a rib 46, which is formed along the rear edge of the taper opening 20A, the front edge of the screw boss 36, and the plane of opening of the opening 20, respectively, is continuous with the rib 44. In this way, the strength around the opening 20 of the case 12 can be ensured or improved.

Moreover, at the rear end of the rib 44, which forms the rear half portion of each guide groove 42, the rib 44 bends back in a substantial U shape and is closed. Moreover, the rib 44 of the upper case 16 is formed to be longer toward the rear than the rib 44 of the lower case 18. This is in order for the memory board M, which is disposed at the right wall 12B side, to not interfere with the door 50, because the inclined rear wall 18C (peripheral wall 18A) of the lower case 18 is formed as an inclined surface of a predetermined angle.

A pair of top and bottom spring catching pins 55 are provided at the longitudinally central portion of the inner side portion of the rear half portion of the rib 44. The spring catching pins 55 are continuous with the play restricting walls 28. The spring catching pin 55 at the lower case 18 side is formed to be longer. An annular portion 56A provided at one end side of a coil spring 56 which will be described later catches on the portion of this spring catching pin 55 which projects higher than the play restricting wall 28. The coil spring 56 is prevented from falling out due to the short spring catching pin 55 at the upper case 16 side abutting the spring catching pin 55 at the lower case 18 side.

The case 12 is formed by the upper case 16 and the lower case 18, which were described above, being fixed or joined together by unillustrated screws being screwed, from beneath, into the screw bosses 32, 36 as well as other screw bosses (not illustrated), in a state in which the peripheral walls 16A, 18A abut one another. Parts of the upper case 16 and parts of the lower case 18 are integrally formed by resin molding, respectively.

Structure of Door

The above-described opening 20 is opened and closed by the door 50 which serves as a shielding member. The door 50 is formed in an arc-shape which curves along the direction of plate thickness thereof, and whose curvature as seen in plan view coincides with the curvature of the guide grooves 42 (the predetermined circumference). Further, the portion of the door 50 at the front portion thereof (at least the portion thereof which closes the opening 20) where the plate width (height) is formed to be substantially the same as the opening height of the opening 20, is a closing portion 50A. The portion of the door 50 which is at the rear side of the closing portion 50A and whose plate width is slightly smaller than that of the closing portion 50A, is a driving portion 50B.

Figure 5A:
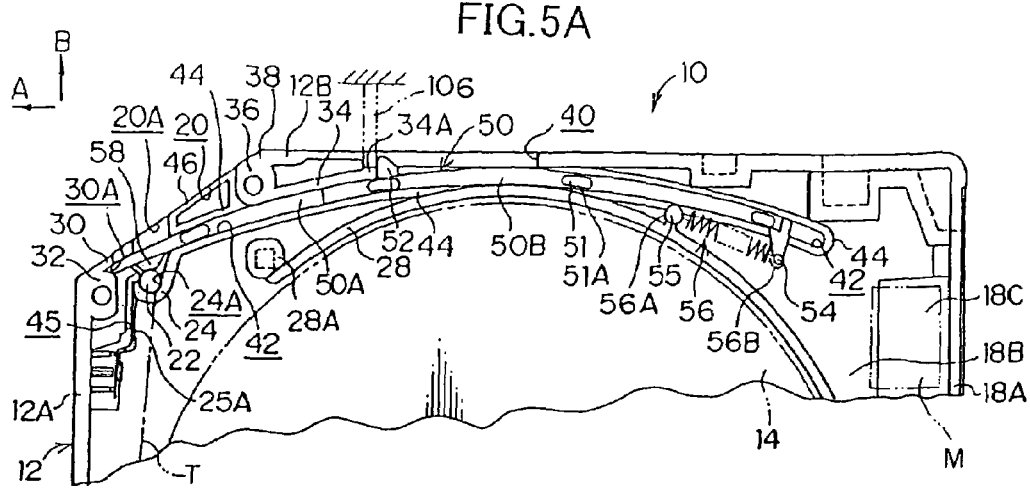
FIG. 5A is a plan view of the recording tape cartridge relating to the embodiment, with the upper case removed, showing an opening process of a cartridge opening, with an anchor projection of a drive device is at an initial engaging state with an operation projection of a door.

The plate length of the door 50 (the curved longitudinal dimension thereof) is determined such that, in the state in which the door 50 closes the opening 20, the rear end portion of the driving portion 50B is positioned in the right rear corner portion of the case 12 (see FIG. 5A). Note that the bottom rear portion of the driving portion 50B is cut obliquely in order to avoid the memory board M which is disposed at the inclined surface of the inclined rear wall 18C of the lower case 18.

The door 50 closes the opening 20 (see FIG. 5A) in a state in which the distal end portion of the closing portion 50A enters into the concave portions 30A which are positioned at the outer sides of the screw bosses 32. When the door 50 moves or rotates substantially rearward along the guide grooves 42 so as to open the opening 20 (see FIG. 5B) and the outer peripheral surface of a vicinity of the distal end of the closing portion 50A reaches a vicinity of the inner sides of the screw bosses 36, the opening 20 is completely opened (see FIG. 5C). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of the door 50 (the configuration of the guide grooves 42) to be appropriately determined in accordance with the positions of the front and rear edge portions of the opening 20 (the screw bosses 32, 36) which are determined by the requirements of the drive device, or in accordance with the angle of the plane of opening of the opening 20 which is determined by the requirements of the library device, or the like.

Further, a plurality of convex portions 51, which enter into the upper and lower guide grooves 42, project at the upper and lower ends of the door 50. The projecting heights of the convex portions 51 differ at the closing portion 50A and the driving portion 50B. However, the distance from the central line running along the longitudinal direction of the door 50 to the peak portion of each convex portion 51 is constant. In this way, the top and bottom convex portions 51 slide along the ceiling plate 16B or the floor plate 18B which are the floor portions of the guide grooves 42.

Projections 51A, whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, it does not enter into the taper opening 20A which is continuous with the guide groove 42. At the time when the door 50 is opening and closing the opening 20, the door 50 is guided in the guide grooves 42 by the convex portions 51 and the projections 51A, and does not jut out from the aforementioned locus of movement. The door 50 twists its way through at the outer sides of the screw bosses 32 and the inner sides of the screw bosses 36 and between the right wall 12B and the play restricting walls 28, and reliably opens the opening 20.

The operation projection 52, which serves as an operation portion, projects along the radial direction of the door 50 at the outer peripheral portion in a vicinity of the front end (the closing portion 50A side) of the driving portion 50B of the door 50. The operation projection 52 is exposed to the exterior of the case 12 from the slit 40. Accompanying the loading (relative movement) of the recording tape cartridge 10 into a drive device, the operation projection 52 engages with an engaging projecting portion 104 which enters in from the portion of the slit 40 which opens toward the front. The operation projection 52 thereby moves the door 50 in the direction of opening the opening 20.

A substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging mechanism. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50.

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the play restricting walls 28 and the peripheral walls 16A, 18A (the inclined rear wall 18C) at this rear right corner portion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like of the cartridge 10.

Figure 5B:
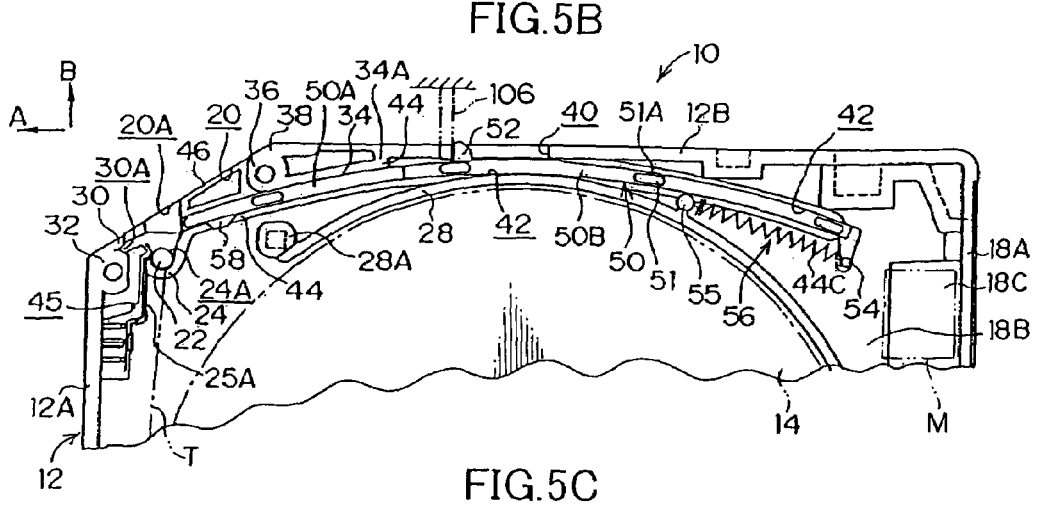
FIG. 5B is a plan view showing a state in the midst of progression of opening the opening of FIG. 5A.
Figure 5C:
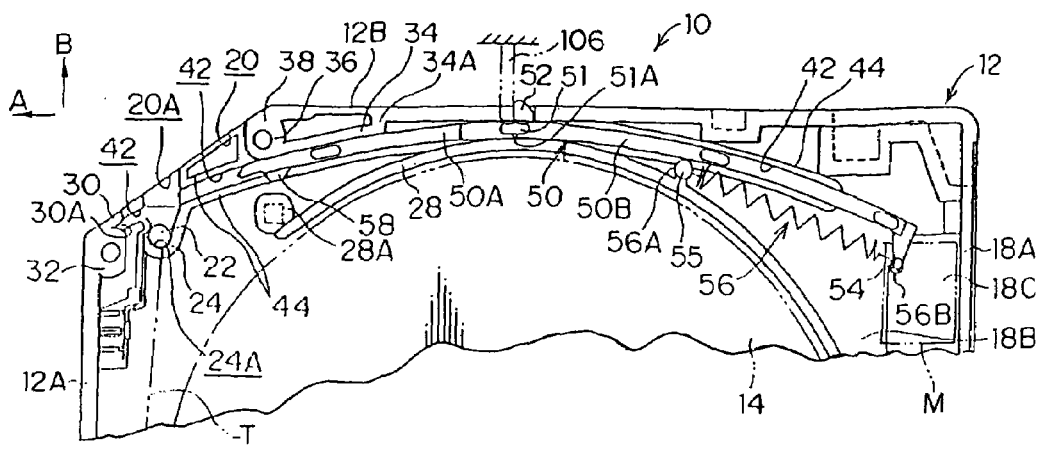
FIG. 5C is a plan view showing a state in which the opening process is completed.
Figure 6:
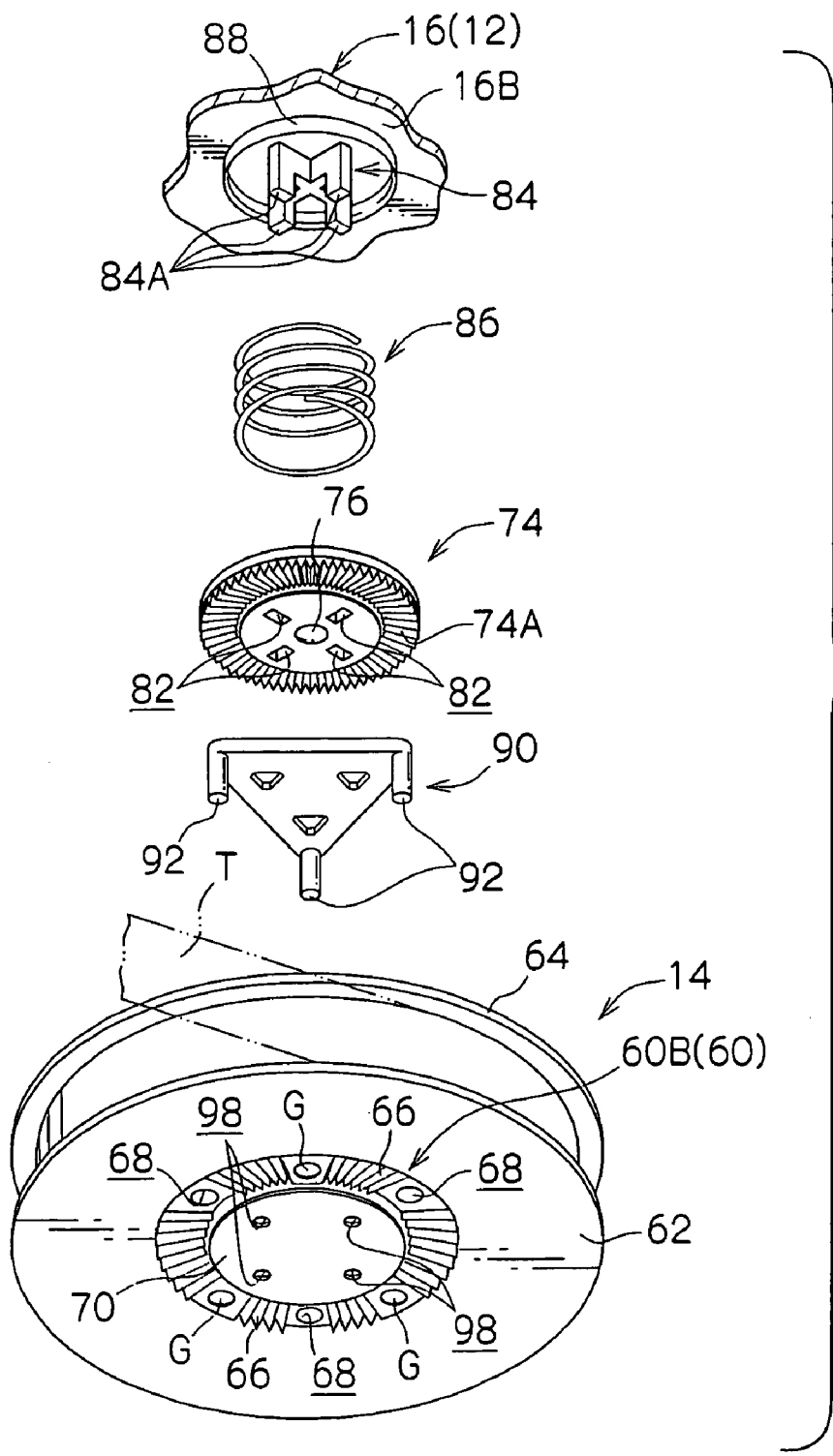
FIG. 6 is an exploded perspective view, as seen from below, of a reel and a braking mechanism which form the recording tape cartridge relating to the embodiment.

Due to the operation of the recording tape cartridge 10 being loaded into a drive device, the operation projection 52 engages with the engaging projecting portion 106 of the drive device (see FIGS. 5A through 5C). The above-described door 50 thereby moves with respect to the case 12 against the urging force of the coil spring 56, and opens the opening 20. When the recording tape cartridge 10 is to be ejected from the drive device, the door 50 closes the opening 20 due to the urging force of the coil spring 56.

Moreover, the door 50, which is curved in an arc-shape, opens and closes the opening 20 (which is inclined with respect to the direction of arrow A) by rotating so as to circle around the outer sides of the reel 14 and the pin stands 24 (the leader pin 22), without jutting out from the locus of movement which runs along the curved configuration of the door 50. In this way, the door 50 does not jut out from the region of the outer shape of the case 12 at the time of opening and closing the opening 20.

Structures of Reel and Braking Mechanism

Figure 7:
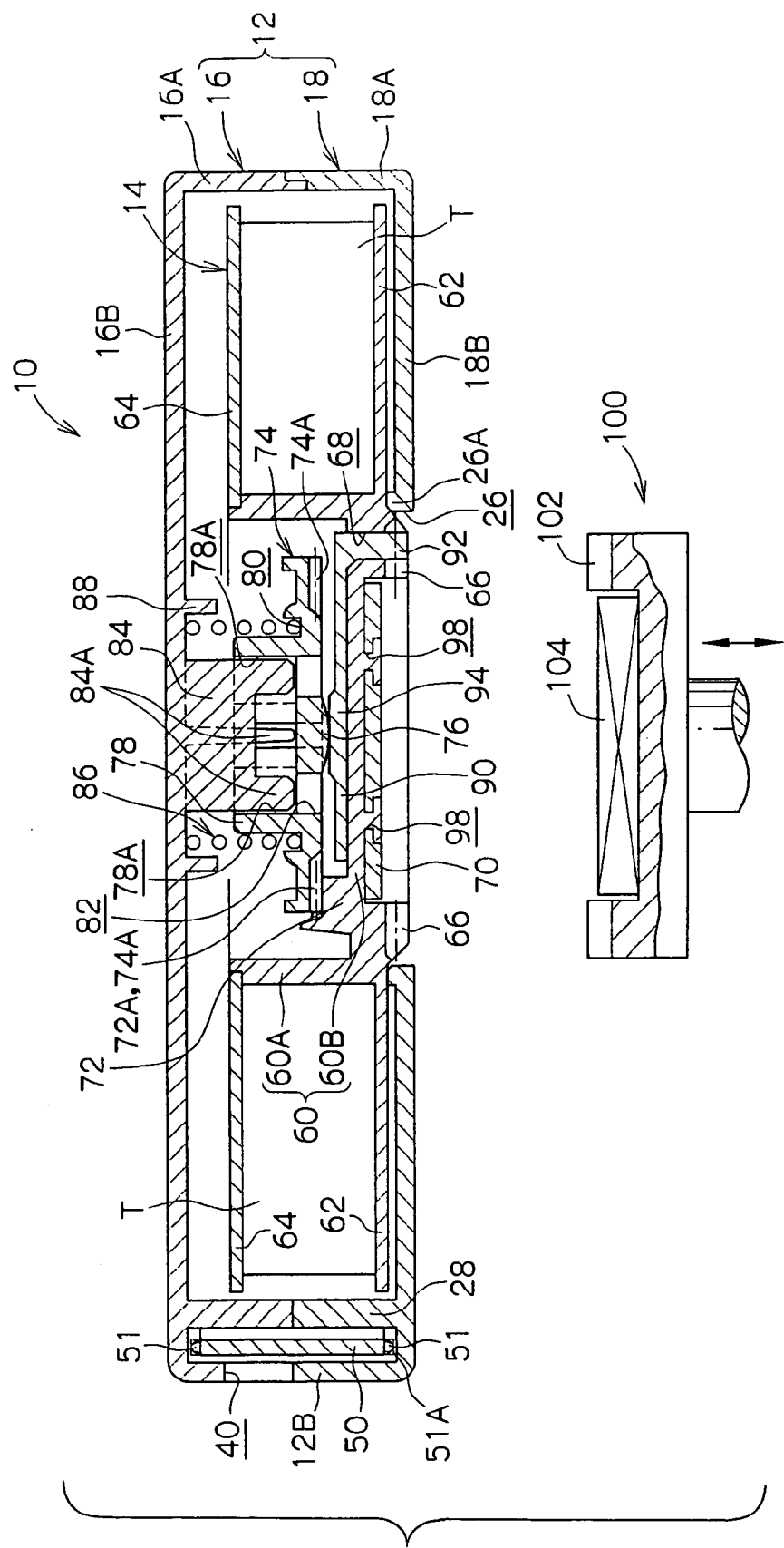
FIG. 7 is a cross-sectional view showing a state in which rotation of the reel of the recording tape cartridge relating to the embodiment is locked.

As shown in FIGS. 2 and 7, the reel 14 has a reel hub 60 which is shaped as a substantial hollow cylinder having a bottom. The reel hub 60 has a tubular portion 60A, on whose outer peripheral surface the magnetic tape T is wound, and a floor portion 60B which closes the bottom portion of the tubular portion 60A. A lower flange 62 extends integrally, substantially coaxially, and outwardly in the radial direction, from a vicinity of the floor portion 60B side end portion (the bottom end portion) of the reel hub 60. On the other hand, an upper flange 64 of an annular ring shape corresponding to the lower flange 62 is joined by ultrasonic welding or the like to the upper end portion of the reel hub 60.

In this way, between the opposing surfaces of the lower flange 62 and the upper flange 64 at the reel 14, the magnetic tape T is wound around the outer peripheral surface of the tubular portion 60A of the reel hub 60, and the tubular portion 60A is open upwardly. The outer diameters of the lower flange 62 and the upper flange 64 are slightly smaller than the inner diameters of the play restricting walls 28 of the case 12, such that the reel 14 can rotate within the case 12.

Further, as shown in FIG. 7, the bottom end portion of the floor portion 60B of the reel hub 60 projects slightly more than the bottom surface of the lower flange 62. A reel gear 66, which is formed in an annular form, is provided in a vicinity of the outer periphery of this bottom end portion. The reel gear 66 can mesh with a driving gear 102 which is provided at the distal end of a rotating shaft 100 of a drive device.

Figure 8:
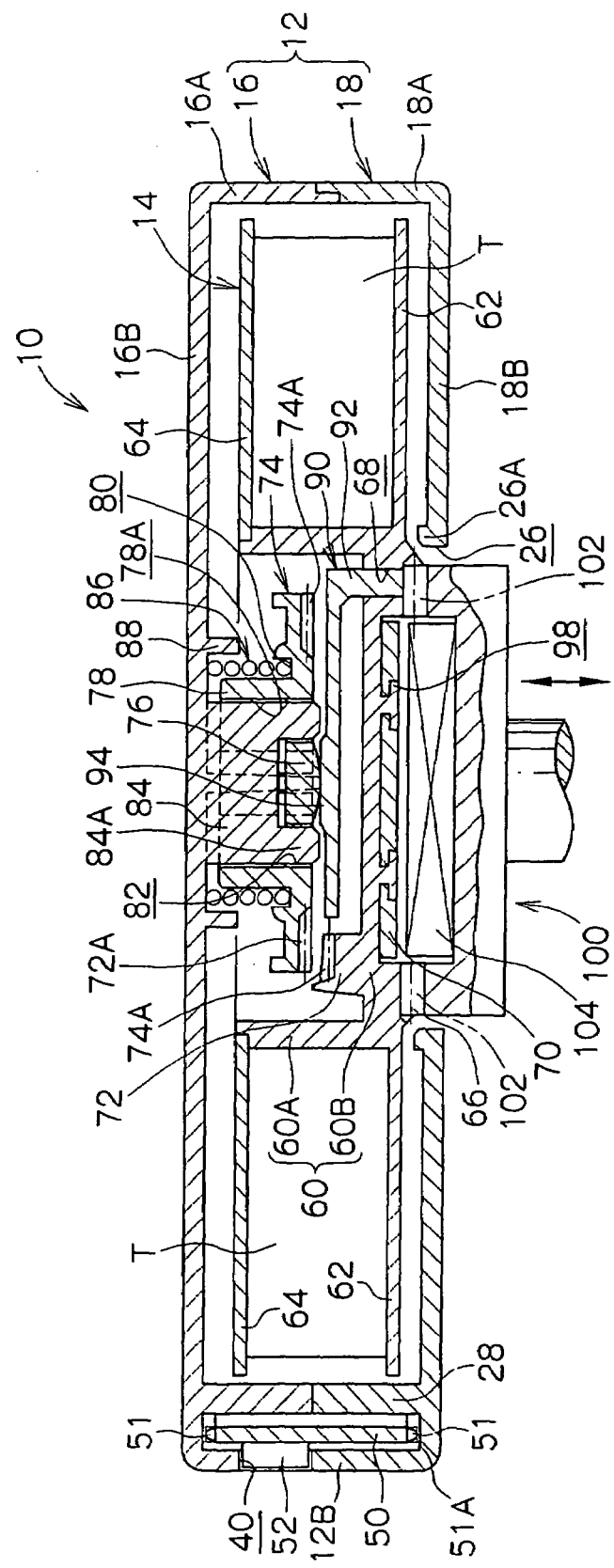
FIG. 8 is a cross-sectional view showing a state in which rotation of the reel of the recording tape cartridge relating to the embodiment is possible.
Figure 9:
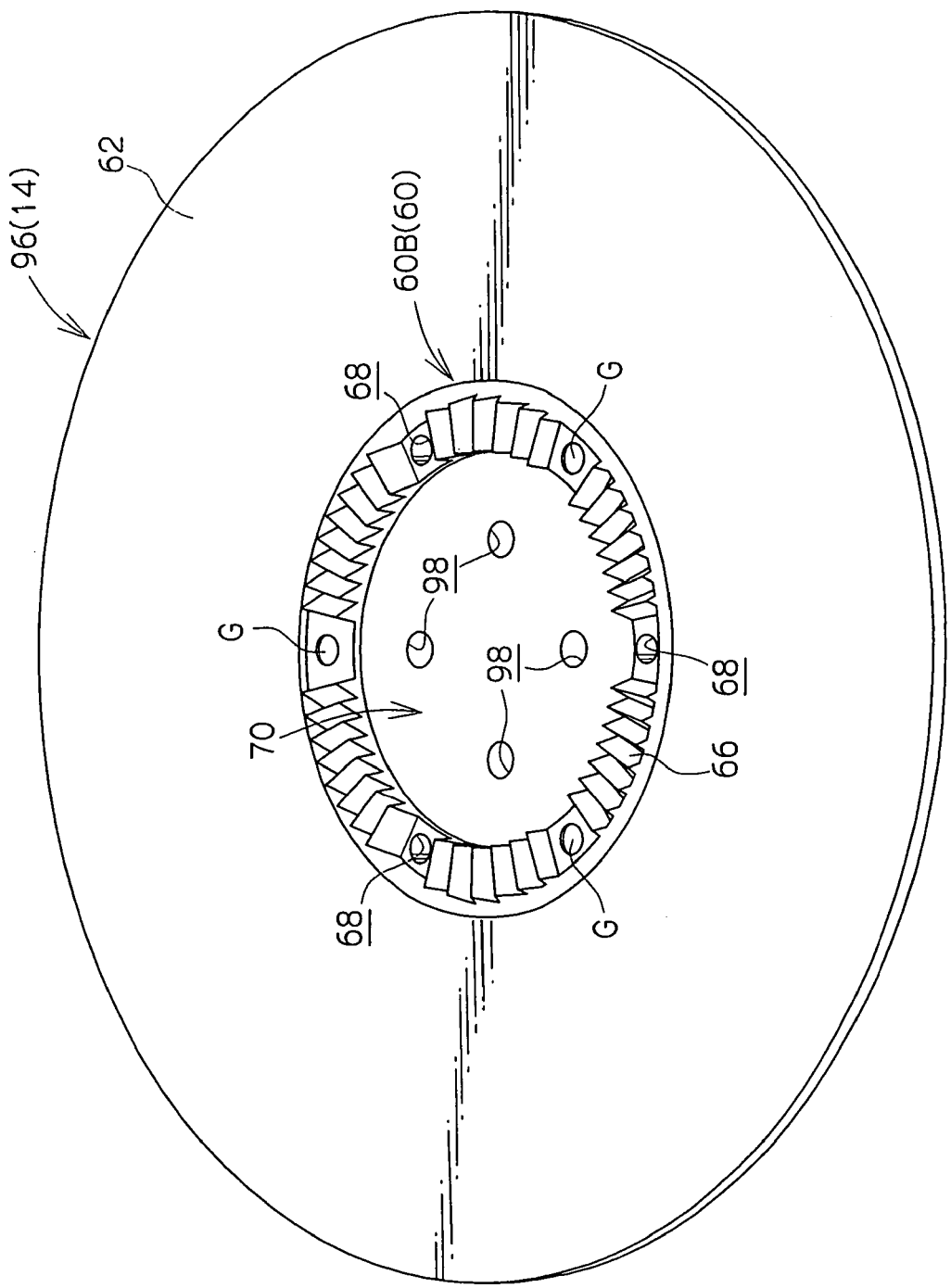
FIG. 9 is a perspective view showing an arrangement of the gate portions in the reel of the recording tape cartridge relating to the embodiment.

As shown in FIGS. 8 and 9, through holes 68, which pass through the floor portion 60B (the reel gear 66) are provided at three places which are spaced apart uniformly on a circumference at the region where the reel gear 66 is set. The diameter of each through hole 68 is larger than the gear pitch of the reel gear 66. The teeth of the reel gear 66 are not provided around each through hole 68.

Moreover, a reel plate 70, serving as a disc-shaped metal plate, formed of a magnetic material which can be attracted by a magnet, is provided integrally by insert molding at the inner side of the reel gear 66 at the bottom end surface (outer surface) of the floor portion 60B of the reel hub 60. The structure of mounting the reel plate to the reel hub 60 will be described later.

As shown in FIG. 7, when the recording tape cartridge 10 is not in use, the bottom end portion of the floor portion 60B of the reel hub 60, which bottom end portion projects further than the lower flange 62, enters into (is fit with play in) the gear opening 26 of the case 12 in a state in which the bottom end portion of the tubular portion 60A (i.e., the radial direction inner end portion of the lower flange 62) abuts the top end portion of the annular rib 26A. In this way, in the state in which the reel 14 is positioned in the case 12, the reel gear 66 and the reel plate 70 are exposed to the exterior of the case 12.

On the other hand, pairs of anchor projections 72 stand erect so as to be spaced evenly apart on a circumference at three places, between the respective through holes 68, at the top surface of the floor portion 60B of the reel hub 60 (see FIG. 2). (Namely, there are a total of six anchor projections 72.) A gear tooth 72A is formed at the distal end portion (the top end portion) of each anchor projection 72 (see FIG. 8). The gear teeth 72A can mesh with a braking gear 74A of a braking member 74 which will be described later.

Rotation of the reel 14 with respect to the case 12 is prevented by a braking mechanism when the recording tape cartridge 10 is not in use. This braking mechanism has the braking member 74 shown in FIGS. 2 and 8. The braking member 74 is formed in a substantial disc shape. The braking gear 74A, which can mesh with the gear teeth 72A of the reel 14, is formed in an annular form in a vicinity of the outer periphery of the lower end surface of this disc portion. A pivoting portion 76, which abuts a release pad 90 which will be described later, projects at the axially central portion of the bottom surface of the braking member 74. The pivoting portion 76 is shaped as a substantially spherical surface, and substantially point-contacts the release pad 90.

On the other hand, as shown in FIG. 7, a cross-shaped projection 78 stands erect at the top surface of the braking member 74. An insertion groove 78A, which is substantially cross-shaped in plan view, is formed at the inside of the cross-shaped projection 78. Further, a spring receiving recess 80, which is surrounded by a wall portion which is annular as seen in plan view, is formed at the outer side of the cross-shaped projection 78 at the top surface of the braking member 74. Through holes 82 are provided in the plate thickness portion (i.e., the disc portion) of the braking member 74. Four of the through holes 82 are formed so as to communicate with the braking member 74 at the radial direction outer side portions of the insertion groove 78A (which is formed in a cross shape in plan view), except for the intersection portion which is the axially central portion of the insertion groove 78A. The through holes 82 are formed in rectangular shapes corresponding to these portions. The respective through holes 82 are positioned at the radial direction outer side of the pivoting portion 76, and pass through the braking member 74 in the direction of plate thickness thereof.

The braking member 74, which is structured as described above, is inserted into the tubular portion 60A of the reel hub 60 so as to be substantially coaxial with the reel 14 and so as to be movable in the vertical directions (i.e., the axial direction of the reel 14). Namely, due to the braking member 74 moving in the vertical directions, the braking gear 74A can move between a position of meshing with the gear teeth 72A of the anchor projections 72 which are provided at the reel hub 60 (i.e., a rotation locked position which is a meshing position), and a position at which the aforementioned meshing is released (i.e., a released position).

Further, a cross-shaped rib 84 (see FIGS. 3 and 6), which projects downward from the ceiling plate 16B of the case 12, enters into the insertion groove 78A of the cross-shaped projection 78 of the braking member 74. The cross-shaped rib 84 is shaped as a detent which is formed as if two thin plate pieces intersect one another perpendicularly. Due to the cross-shaped rib 84 engaging with the cross-shaped projection 78 (the groove walls of the insertion groove 78A), rotation of the braking member 74 with respect to the case 12 is prevented.

In this way, in the state in which the braking gear 74A of the braking member 74 meshes with the gear teeth 72A of the reel hub 60, the braking member 74 prevents rotation of the reel 14. Note that the cross-shaped rib 84 is maintained in a state of being inserted in the insertion groove 78A along the entire vertical direction stroke of movement of the braking member 74, and also functions to guide the direction of movement of the braking member 74 in the vertical directions.

Projecting pieces 84A extend downward from four places at the bottom end portion of the cross-shaped rib 84, other than the aforementioned intersection portion. Each projecting piece 84A enters into the through hole 82 of the braking member 74 (passes through and projects toward the braking gear 74A side) when the braking member 74 is positioned at the released position. In this way, the amount of engagement (the depth of insertion) of the cross-shaped rib 84, which has the projecting pieces 84A, with the braking member 74 is greatly increased, and tilting of the braking member 74 with respect to the case 12 is suppressed. In the present embodiment, the amount of engagement, in the axial direction, of the cross-shaped rib 84 (including the projecting pieces 84A) with the braking member 74 which is positioned at the rotation locked position, is set to be sufficiently larger than the entire stroke of movement of the braking member 74 (see FIGS. 7 and 8).

Further, a compression coil spring 86 serving as an urging mechanism is disposed between the ceiling plate 16B and the spring receiving recess 80 of the braking member 74. One end portion of the compression coil spring 86 enters into the spring receiving recess 80, whereas the other end portion of the compression coil spring 86 enters in at the inner side of an annular wall portion 88 which projects from the outer side of the cross-shaped rib 84 at the ceiling plate 16B. The position of the compression coil spring 86 does not become offset in the radial direction.

Due to the urging force of the compression coil spring 86, the braking member 74 is urged downward, and usually, the braking gear 74A meshes with the gear teeth 72A such that inadvertent rotation of the reel 14 is reliably prevented (i.e., the braking member 74 is positioned at the rotation locked position). Further, due to this urging force, the reel 14, which meshes with the braking member 74 at the anchor projections 72, also is urged downward, and, as described above, the lower flange 62 abuts the annular rib 26A such that the reel 14 does not joggle within the case 12.

The release pad 90, which serves as a releasing member, is disposed between the braking member 74 and the floor portion 60B within the reel hub 60 (the tubular portion 60A) of the reel 14. The release pad 90 is formed in the shape of a flat plate which substantially is an equilateral triangle as seen in plan view. Three leg portions 92, which are solid cylindrical and correspond to the through holes 68 of the floor portion 60B, project from the bottom surface of the release pad 90 in vicinities of the respective vertices. A sliding-contact projecting portion 94, which abuts the pivoting portion 76 of the braking member 74, projects from the central portion of the top surface of the release pad 90.

In the state in which the respective leg portions 92 are inserted through the through holes 68 so as to be movable in the vertical directions, the release pad 90 is placed on the floor portion 60B of the reel hub 60 so as to not interfere with the anchor projections 72 (i.e., the bottom surface of the release pad 90 abuts the top surface of the floor portion 60B). In this state, the leg portions 92 project further than the bottom end portions of the through holes 68, such that the distal ends of the leg portions 92 and the addendum of the reel gear 66 are substantially the same level. Due to the sliding-contact projecting portion 94 of the release pad 90 abutting the pivoting portion 76 of the braking member 74, the release pad 90 maintains the above-described projected state of the leg portions 92 due to the urging force of the compression coil spring 86.

On the other hand, when the leg portions 92 are pushed upward against the urging force of the compression coil spring 86, the release pad 90 pushes up the braking member 74 which the release pad 90 is abutting at the sliding-contact projecting portion 94 thereof. The meshing of the braking gear 74A and the gear teeth 72A of the anchor projections 72 is released (the braking member 74 is moved to the released position). Specifically, when the driving gear 102 meshes with the reel gear 66 of the reel 14, due to the rotating shaft 100 moving upward relative to the case 12, the leg portions 92 of the release pad 90 are pushed by the addendum of the driving gear 102. In this way, accompanying the meshing of the driving gear 102 with the reel gear 66, the reel 14 floats up within the case 12 against the urging force of the compression coil spring 86 (the lower flange 62 is moved away from the annular rib 26A). Simultaneously, the state in which rotation is prevented by the braking member 74 is released, such that the reel 14 becomes able to rotate within the case 12.

Note that, in this state, the leg portions 92 of the release pad 90 are positioned within the through holes 68 of the reel hub 60, and when the rotating shaft 100 rotates, the release pad 90 rotates together with the reel 14. Thus, the braking member 74 and the release pad 90 rotate relative to one another at the time when the reel 14 is rotating, and the pivoting portion 76 and the sliding-contact projecting portion 94 thereof (which are the regions thereof which abut one another) slidingly contact one another.

In the state in which the reel gear 66 meshes with the driving gear 102, the magnet 104, which is disposed at a radial direction inner side of the driving gear 102 of the rotating shaft 100, magnetically (i.e., in a non-contact manner) attracts and holds the reel plate 70 of the reel 14.

Molding Structure of Reel

The reel 14 is integrally formed by the reel hub 60 and the lower flange 62 by resin molding. In this embodiment, the reel hub 60 and the lower flange 62, which are formed integrally with each other, are altogether referred to as a "main portion 96". At the reel 14, the reel plate 70 is firmly attached by insert molding to the floor portion 60B of the main portion 96. Further, the upper flange 64 is formed by resin molding separately from the main portion 96 and is attached firmly to a top end of the tubular portion 60A by ultrasonic welding or the like. The structure of molding the reel plate 70 integrally with the main portion 96 by insert molding will be described below.

Figure 10:
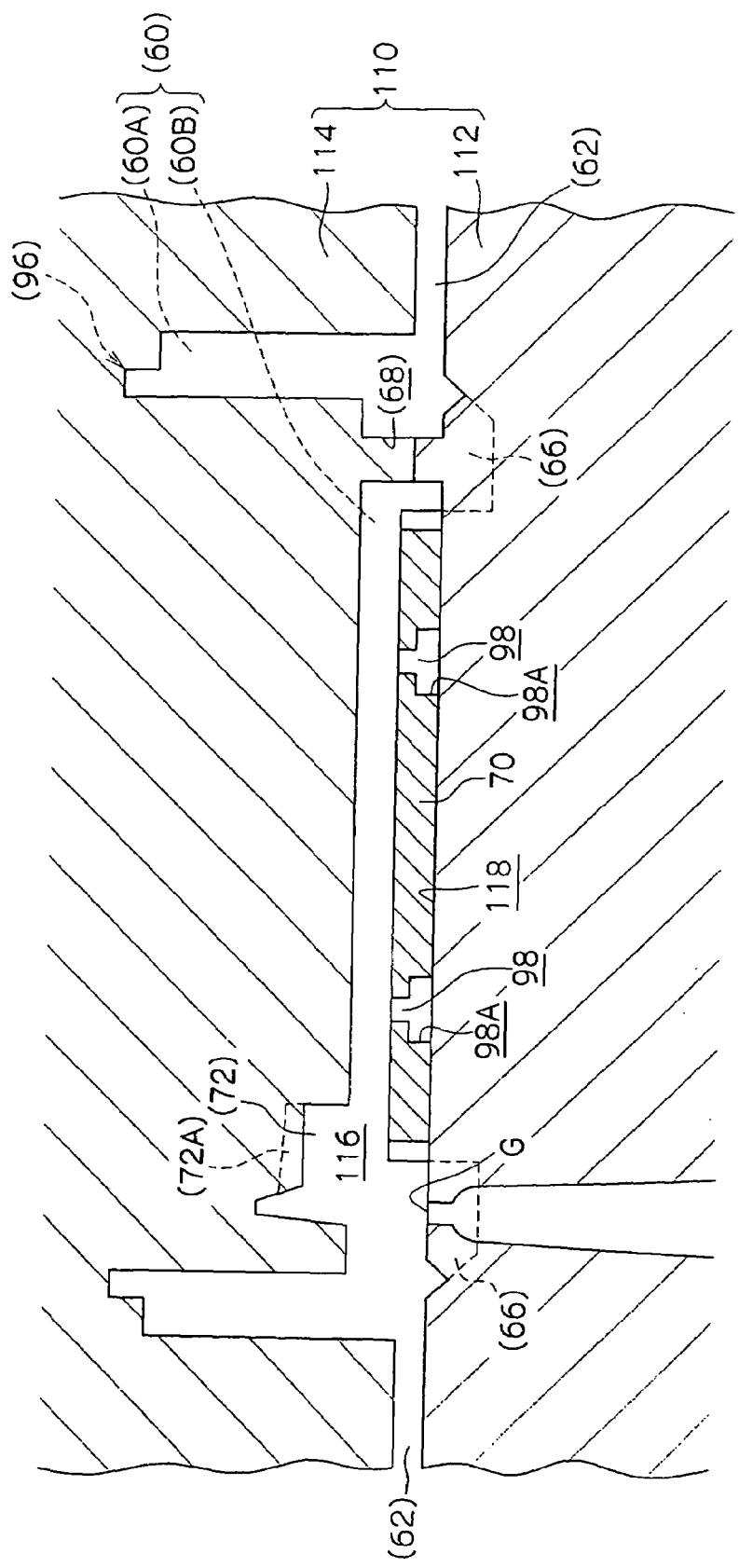
FIG. 10 is a cross-sectional view of a mold structure which is used for molding a main portion of the reel of the recording tape cartridge relating to the embodiment.

As shown in FIG. 10, the main portion 96 is integrally formed using a mold 110. The mold 110 has a stationary retainer plate 112 (a first mold or a second mold) and a movable retainer plate 114 (the second mold or the first mold). The mold 110 is closed with the reel plate 70 attached firmly to the stationary retainer plate 112. Then a resin material, which is a molding material, is introduced into a cavity 116 so that the main portion 96 is molded. The cavity 116 is formed by the stationary retainer plate 112 and the movable retainer plate 114. Note that the parented numbers denoting the cavity 116 in FIG. 10 correspond to the portions of the reel 14 formed by the mold 110.

A concave portion 118, whose internal diameter substantially coincides with an external diameter of the reel plate 70, is provided in the stationary retainer plate 112. The reel plate 70 is placed in the concave portion 118. In this way, the reel plate 70 is positioned with respect to the stationary retainer plate 112 (the mold 110). Here, it is not necessary to position the reel plate 70 in a direction in which it rotates.

A plurality of through holes 98 (four in this embodiment as shown in FIG. 9) is provided in the reel plate 70. The through holes 98 pass through the reel plate 70 in the direction of plate thickness thereof. Each through hole 98 is of a so-called socket-and-spigot joint shape having a large-diameter portion 98A at one axial end portion thereof. The reel plate 70 is placed in the concave portion 118 of the stationary retainer plate 112 such that the large-diameter portion 98A of the through hole 98 is positioned toward the stationary retainer plate 112 (i.e., opposite to the floor portion 60B). In this way, after the resin material is introduced into the through holes 98 and then cooled and cured, the main portion 96 is integrally molded having the reel plate 70 firmly attached thereto.

The resin material is introduced into the cavity 116 through gate portions G. The gate portions G are positioned at the region where the reel gear 66 is formed (i.e., at the radial direction outer side of the reel plate 70). In particular, as shown in FIG. 9, a plurality of gate portions G (three in this embodiment) is provided, each gate portion G is positioned between adjacent through holes 68. Thus, the gate portions G are equally spaced apart from one another on a circumference which is coaxial with the reel hub 60.

In this way, the main portion 96 of the reel 14 does not have gate portions G in the area where the reel plate 70 is provided. The reel plate 70 include neither holes nor cut-outs for providing the gate portions G.

Next, operation of the present embodiment will be described.

When the recording tape cartridge 10 having the above-described structure is not being used (e.g., is being stored or transported or the like), the door 50, whose distal end portion has entered into the concave portions 30A due to the urging force of the coil spring 56, closes the opening 20. Further, as shown in FIG. 7, at the reel 14, the reel gear 66 and the reel plate 70 are exposed from the gear opening 26 while the bottom end surface of the tubular portion 60A is being made to abut or being pushed against the annular rib 26A due to the urging force of the compression coil spring 86 which is transmitted via (the release pad 90 and) the braking member 74 which meshes with the anchor projections 72. Due to the urging force of the compression coil spring 86, the braking gear 74A of the braking member 74 meshes with the gear teeth 72A of the anchor projections 72, and rotation of the reel 14 with respect to the case 12 is prevented. Namely, the braking member 74 is positioned at the rotation locked position.

On the other hand, when the magnetic tape T is to be used, the recording tape cartridge 10 is loaded into a bucket (not illustrated) of a drive device along the direction of arrow A. Accompanying this loading, the engaging projecting portion 106 (see FIGS. 5A through 5C), which is fixed to the bucket, engages with the operation projection 52 of the door 50. The door 50 thereby rotates substantially rearward and opens the opening 20. Then, when the recording tape cartridge 10 is loaded to a predetermined depth in the bucket, the bucket is lowered. The rotating shaft 100 of the drive device relatively approaches the gear opening 26 of the case 12 (i.e., relatively moves upward), and holds the reel 14. Specifically, at the rotating shaft 100, the driving gear 102 meshes with the reel gear 66 while the reel plate 70 is magnetically attracted and held in a non-contact manner by the magnet 104.

Accompanying this meshing of the reel gear 66 and the driving gear 102, the addendum of the driving gear 102 abut the distal ends (lower end surfaces) of the leg portions 92 of the release pad 90, and push the release pad 90 upward against the urging force of the compression coil spring 86. In this way, the braking member 74, which is abutting the release pad 90 at the pivoting portion 76, is also moved upward. The meshing of the braking gear 74A of the braking member 74 and the gear teeth 72A of the anchor projections 72 is released. When the rotating shaft 100 moves further upward, the reel 14 is, against the urging force of the compression coil spring 86, raised upward together with the release pad 90 and the braking member 74 (with the relative positions thereof remaining unchanged), and the lower flange 62 moves apart from the annular rib 26A. In this way, the reel 14 floats up within the case 12, and becomes able to rotate in a state in which it does not contact the inner surfaces of the case 12.

Further, due to the bucket being lowered, the recording tape cartridge 10 is positioned within the drive device. In this state, the pull-out mechanism of the drive device pulls the leader pin 22 out from the opening 20 which has been opened, and accommodates the leader pin 22 at a take-up reel of the drive device. When the drive device drives and rotates the take-up reel and the reel 14 (the rotating shaft 100) synchronously, the magnetic tape T is successively pulled-out from the case 12 while being taken-up onto the take-up reel. Information is recorded or played-back by a recording/playback head or the like disposed along a predetermined tape path.

On the other hand, when the magnetic tape T is rewound onto the reel 14 and the leader pin 22 is held at the pin stands 24, the bucket, in which the recording tape cartridge 10 is loaded, is raised. In this way, the meshing of the reel gear 66 and the driving gear 102 is cancelled, and the abutment of the driving gear 102 and the leg portions 92 of the release pad 90 is cancelled. Due to the urging force of the compression coil spring 86, the release pad 90 moves downward together with the braking member 74 (while the state in which the release pad 90 and the braking member 74 abut one another is maintained). In this way, the respective leg portions 92 of the release pad 90 project from the through holes 68 to the region where the reel gear 66 is formed, and the braking gear 74A of the braking member 74 meshes with the gear teeth 72A of the anchor projections 72. Namely, the braking member 74 returns to the rotation locked position at which the braking member 74 prevents rotation of the reel 14.

Moreover, accompanying the movement of the braking member 74 and the release pad 90 due to the urging force of the compression coil spring 86, the reel 14 also moves downward. The reel 14 returns to the initial state in which the reel gear 66 is exposed from the gear opening 26 while the bottom end surface of the tubular portion 60A abuts the annular rib 26A. Further, when the recording tape cartridge 10 is to be ejected from the bucket, the recording tape cartridge 10 is moved in the direction opposite to the direction of arrow A by the urging force of the coil spring 56 or by an unillustrated ejecting mechanism. Accompanying this movement, the door 50 closes the opening 20 due to the urging force of the coil spring 56. In this way, the recording tape cartridge 10 is ejected from the drive device and returned to its initial state.

For molding the reel 14, which forms the recording tape cartridge 10, the movable retainer plate 118 is attached to the stationary retainer plate 112 with the reel plate 70 mounted in the concave portion 118 of the stationary retainer plate 112, and the mold 110 is closed. In the state in which the mold 110 is closed, the resin material is introduced through the gate portions G to fill the cavity 116. Then, while the pressure in the cavity 116 is being kept, the resin material in the cavity 116 is cooled and cured. The cooled and cured resin material is then removed from the mold. As a result, the main portion 96 with the reel plate 70 firmly attached thereto is integrally molded. Namely, the reel plate 70 is attached firmly to an outer surface of the floor portion 60B of the reel hub 60 by insert molding and the lower flange 62 is integrally provided so as to extend toward the vicinity of the bottom end portion of the tubular portion 60A of the reel hub 60. Further, the upper flange 64, which is formed by resin molding separately from the main portion 96, is attached firmly to the top end of the tubular portion 60A of the main portion 96 by ultrasonic welding. The reel 14 is thus formed.

Because the gate portions G are positioned at the radial direction outer side of the reel plate 70 on the floor portion 60B of the reel hub 60, the gate portions G and the reel plate 70 do not interfere with each other. Thus, it is not necessary to provide holes or cut-outs for providing the gate portions G. As a result, the area of the reel plate 70 for being attracted by the magnet 104 is made large. In this way, the reel 14 can be held more securely by the rotating shaft 100. Further, by the reel plate 70 not having holes of cut-outs for providing the gate portions G other than the axial center thereof, it is not necessary to position the reel plate 70 in the direction in which it rotates within the concave portion 118 of the mold 110 at the time of insert molding. Therefore, no device that is dedicated for positioning the reel plate 70 in the direction in which it rotates within the mold 110 is required.

Moreover, because the reel plate 70 is attached firmly to the main portion 96 (reel hub 60) by insert molding, the profile accuracy of the surface (lower surface) of the reel plate 70 is improved compared to a structure in which the reel plate 70 is welded to the main portion 96 by caulking. Thus, each part of the reel plate 70 is kept at a uniform distance from the magnet 104, and the reel 14 is securely held by the rotating shaft 100.

In this way, in the recording tape cartridge 10 relating to this embodiment, the effects of the gate portions G to the reel plate 70, which is attached firmly to the reel hub 60, can be suppressed.

Further, in the recording tape cartridge 10, the a plurality of gate portions G is positioned at places which are spaced apart from the axial center of the reel hub 60 such that the gate portions G are equally spaced apart from one another on a circumference which is coaxial with the reel hub 60. Thus, the flow of the resin material in the cavity 116 is well-balanced. Hence, the setting for resin molding can be made simple and the profile accuracy of the main portion 96 of the reel 14 can be improved.

In particular, because the gate portions G are provided at the region where the reel gear 66 is formed on the floor portion 60B of the reel hub 60, the pressure is kept at the region where the reel gear 66 is formed, which is a thickened region, on the floor portion 60B during the period at which the resin material filled in the cavity 116 is cooled and cured. Thus, shrinkage caused by shrinkage of the region where the reel gear 66 is formed can be prevented, and the molding accuracy of the reel gear 66 is improved. Moreover, gate portions G, each positioned between adjacent through holes 68 at the region where the reel gear 66 is formed, are just below each of the anchor projections 72, which are provided between the through holes 68. With this structure, the pressure can be kept at (a near vicinity of) the most thickened region of the floor portion 60B. Thus, the molding accuracy of the anchor projection 72 (the gear teeth 72A) is improved as well. In this way, the gate portions G are provided at optical regions of the reel 14 (main portion 96) of the shape relating to this embodiment.

From the viewpoint of providing the gate portions G at the thickened region of the reel hub 60 (main portion 96), the gate portions G may be provided on, for example, the bottom end surface the tubular portion 60A. However, from the viewpoint of required functions (i.e., in this embodiment, the function required is that the pitch surface meshing with the driving gear 102 serves as a positioning reference in the axial direction of the reel 14), the gate portions G are preferably provided at the region where the reel gear 66 is formed that needs higher accuracy.

Next, a modified embodiment of the present invention will be described. Note that components which are similar to those of the above-described embodiment are designated by the same reference numerals, and detailed description thereof will be omitted.

Figure 11:
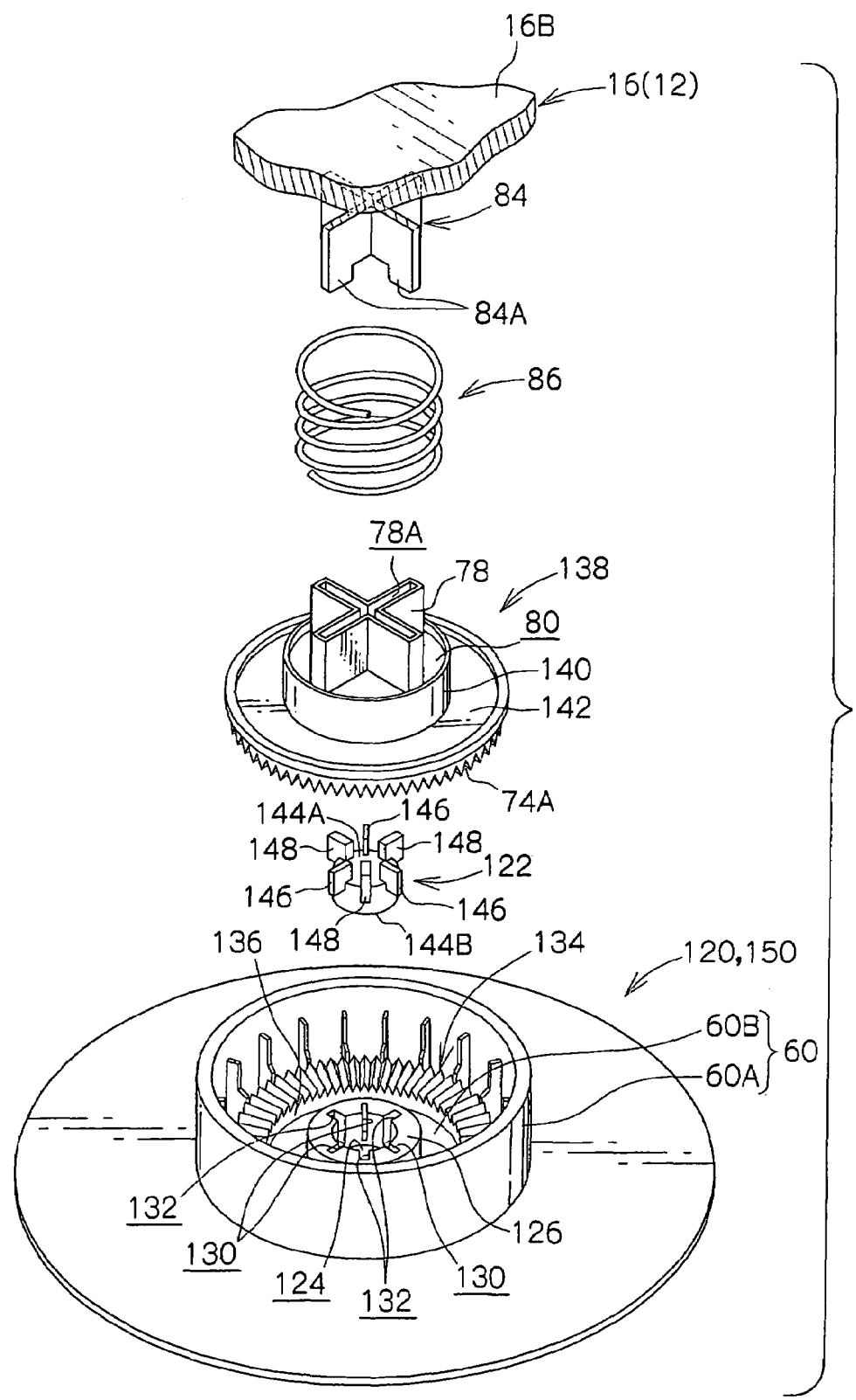
FIG. 11 is an exploded perspective view showing a reel and a braking mechanism relating to a modified embodiment of the present invention.
Figure 12:
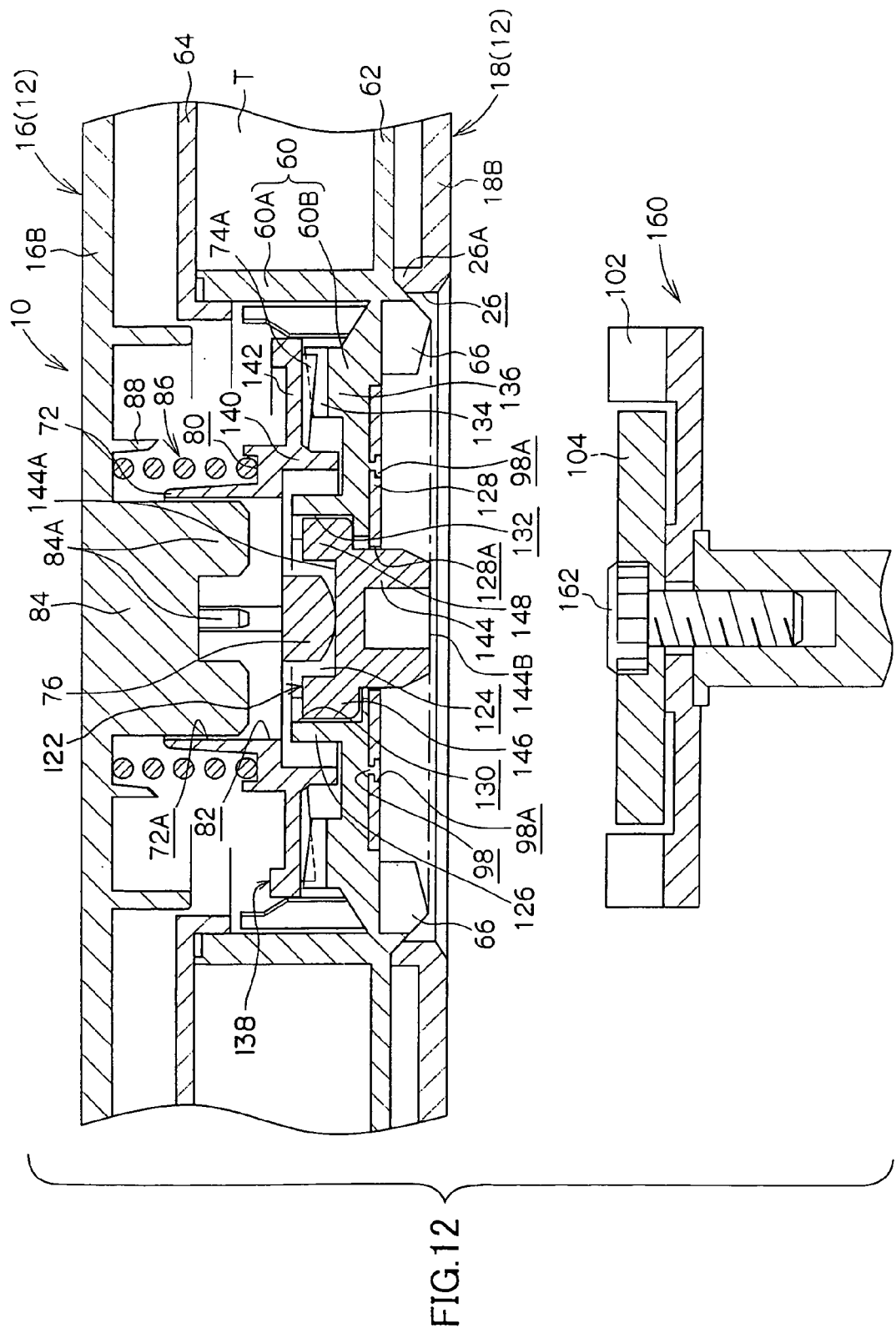
FIG. 12 is a cross-sectional view of the reel and the braking mechanism of FIG. 11.

FIG. 11 shows a braking mechanism of the modified embodiment and a corresponding reel 120 in an exploded perspective view. FIG. 12 shows a part of the braking mechanism of the modified embodiment and the corresponding reel 120 in a cross-sectional view. Note that the upper flange 64 is not illustrated in FIG. 11. The modified embodiment differs from the above-described embodiment in that the braking mechanism includes a clutch member 122 in place of the releasing pad, and the reel 12 has a through hole 124 provided at the axially central portion thereof in place of the three through holes 68 as shown in FIGS. 11 and 12. The clutch member 122 is exposed to the exterior of the case 12 from the through hole 124. Detailed description will be given below.

The reel 120 has a boss 126 for clutching that holds the clutch member 122 operable from outside. The boss 126 is formed in a substantially tubular shape standing upward from the axial central portion of the floor portion 60B of the reel hub 60. Inside of the boss 126 is formed the through hole 124 which passes through the floor portion 60B in the direction of plate thickness thereof. A through hole 128A is provided at the axial center of the reel plate 128 so as to correspond to the through hole 124. The reel plate 128 serves as the metal plate in this modified embodiment. Three rotation regulation slits 130 and three stopper slits 132 are continuous with the through hole 124 in the radial direction outer portion of the through hole 124. The bottom end portions of the slits are closed. The stopper slits 132 are of smaller height than the rotation regulation slits 130. Further, on the top end surface of the floor portion 60B, an annular anchor gear 134 is formed coaxially with the floor portion 60B in place of the anchor projections 72. The anchor gear 134 can mesh with the braking gear 74A. The anchor gear 134 is provided on an annual seat portion 136 which protrudes from the top end surface of the floor portion 60B.

The braking mechanism 138, which prevents rotation of the reel 120 with respect to the case 12 at the time when the recording tape cartridge 10 is not in use, includes a main portion 140. The main portion 140 is of a tubular shape having a floor, whose top end portion is closed. A cross-shaped projection 78 and a spring receiving recess 80 are provided on the top surface of the bottom portion of the main portion 140. Further, a pivot portion 76 is provided protruding downward from the bottom portion of the main portion 140. The pivot portion 76 does not project out further than the bottom end portion of the main portion 140. An annular plate portion 142 extends outwardly in the radial direction from the axial center of the main portion 140. The braking gears 74A are provided downwardly from the bottom portion of the annular plate portion 142.

The clutch member 122 has a substantially tubular-shaped main portion 144. The main portion 144 is slidingly movable within the boss 126 of the reel 120 in the axial direction. A top end surface of the main portion 144 is made as a sliding-contact surface 144A. The pivoting portion 76 of the braking member 138 abuts the sliding-contact surface 144A. A bottom end surface of the main portion 144 is made as an operating surface 144B. The operating surface 144B is made to abut a releasing pressing portion 162 of the rotating shaft 160 of the drive device. Three rotation regulation ribs 146 and three seating ribs 148 are provided on the top portion of the main portion 144 extending in the radial direction outer side of the main portion 144.

The clutch member 122 is assembled to the reel 120 in the following manner. The main portion 144 is placed in the through hole 124 of the boss 126 and in the through hole 128A of the reel plate 128. In the state in which the main portion 144 projects out further than the reel plate 128, each of the rotation regulating ribs 146 enters into corresponding rotation regulation slit 130, and each of the seating ribs 148 enters into corresponding stopper slit 132. The seating ribs 148 abut the closed bottom end portion of corresponding stopper slit 132 when the braking member 138 is positioned at a rotation locked position where the braking gear 74A is meshed with the anchor gear 134. In this way, removal of the clutch member 122 from the reel 120 is prevented. Further, the clutch member 122 is held so as to rotate always integrally with the reel 120. The clutch member 122 may move upward from and may return to the rotation locked position.

The rotating shaft 160 of the driving device has a driving gear 102, a magnet 104, and a releasing pressing portion 162. The releasing pressing portion 162 is provided at an axial central portion of the rotating shaft 160 and presses an operating surface 144 B of the clutch 122 accompanying the meshing of the driving gear 102 with the reel gear 66. With the releasing pressing portion 162 being provided, the magnet 104 is formed in an annular shape.

In this way, in this modified embodiment, at the time when the recording tape cartridge 10 is not in use, the braking gear 74A of the braking member 138 positioned at the rotation locked position is meshed with the anchor gear 134 of the reel 120, thereby impeding rotation of the reel 120 with respect to the case 12. When the magnetic tape T is to be used, accompanying the meshing of the driving gear 102 with the reel gear 66 by the bucket being lowered, the operating surface 144B of the clutch member 122 is pressed against the releasing pressing portion 162 of the rotating shaft 160. Then, the clutch member 122 is pushed upward against the urging force of the compression coil spring 86. In this way, the braking member 138, which is abutting the clutch member 122 at the pivot portion 76, is also moved upward. The meshing of the braking gear 74A of the braking member 138 and the anchor gear 134 is released. That is, the braking member 138 is moved to the released position. In the state, the reel plate 128 is magnetically attracted and held in a non-contact manner by the magnet 104, and the reel gear 66 meshes with the driving gear 102. When the rotating shaft 160 is rotated, the reel 120 is driven to rotate and the magnetic tape T is pulled out of the case 12 or taken up onto the reel 120 in the case 12.

Figure 13:
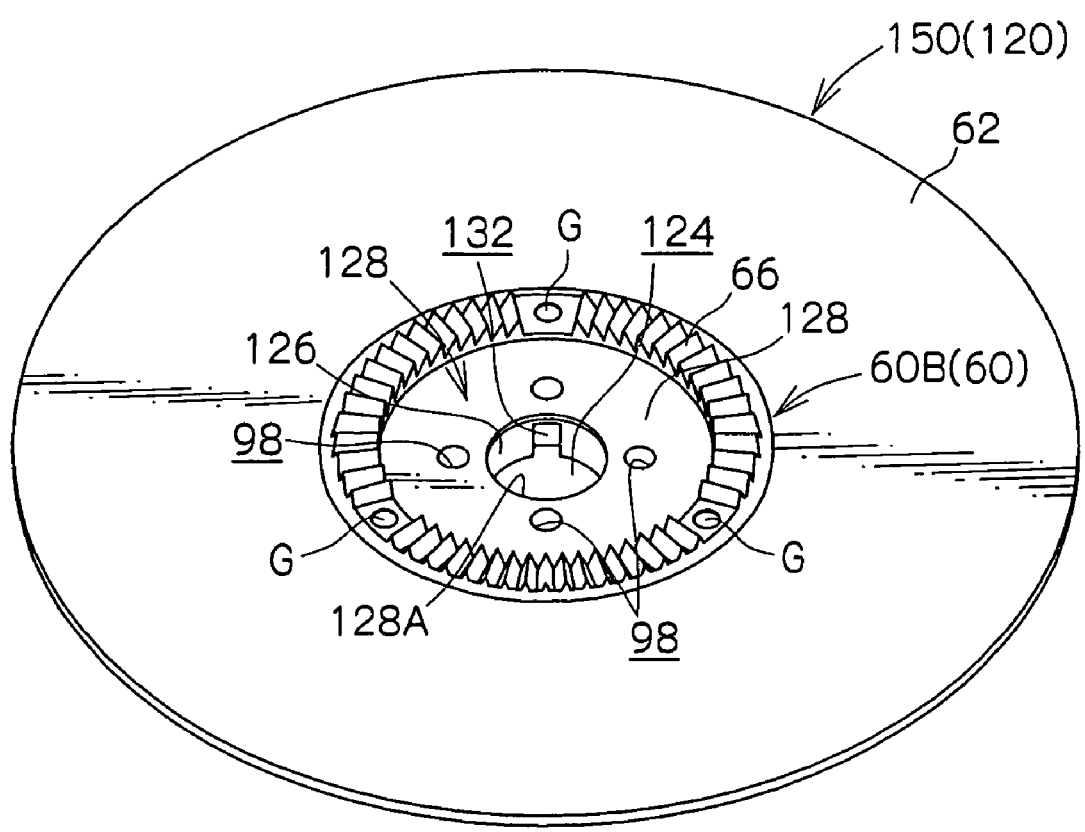
FIG. 13 is a perspective view showing an arrangement of the gate portions in the reel of FIG. 11.
Figure 14:
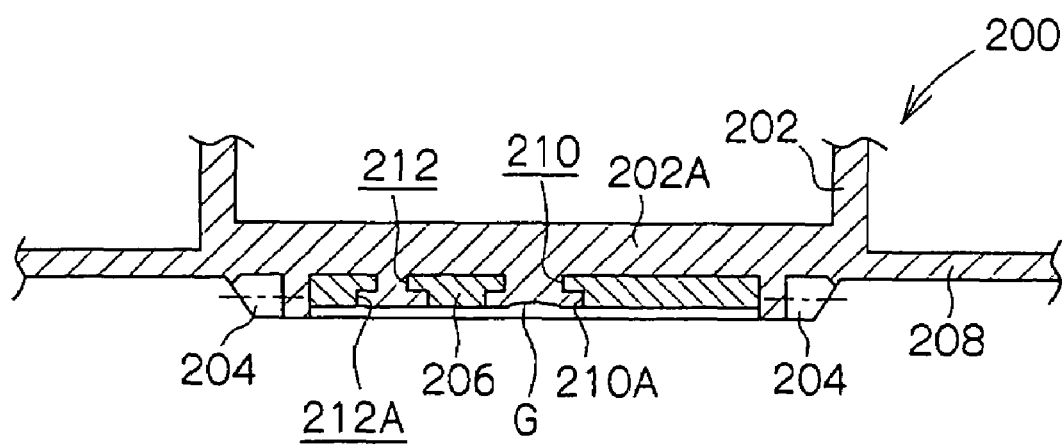
FIG. 14 is a cross-sectional view of a reel which forms a conventional recording tape cartridge.
Figure 15:
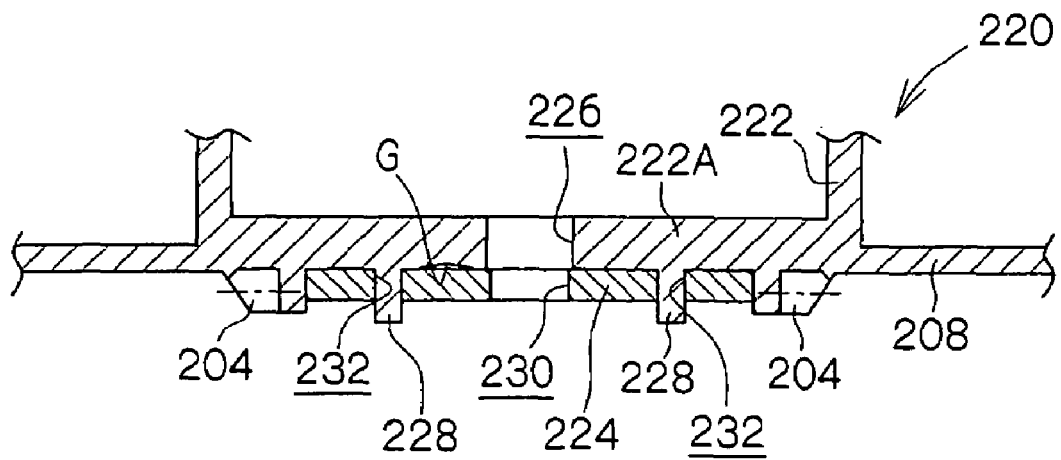
FIG. 15 is a cross-sectional view of another reel which forms a conventional recording tape cartridge.

In the reel 120 relating to the modified embodiment, the reel hub 60 and the lower flange 62 are integrally formed with each other to form a main portion 150. The reel plate 128 is attached firmly to the floor portion 60B of the main portion 150 by insert molding. As shown in FIG. 13, as in the embodiment described above, the gate portions G are disposed at the region where the reel gear 66 is formed. A plurality of gate portions G (three in the modified embodiment) is equally spaced apart from one another.

Consequently, substantially the same effects as those of the above-described embodiment can be obtained in the structure of the modified embodiment. In the modified embodiment, the anchor gear 134 is formed on the annual seat portion 136 provided on the floor portion 60B at the opposite side of the reel gear 66. Although the whole region where the reel gear 66 is formed is made thick, which is different from the above-described embodiment where the anchor projection 72 is partially provided, because the gate portion G are provided at the thickened region, the molding accuracy of the main portion 150 increases compared to the structure where the gate portions G are provided at a thin region. That is, the dimensional accuracy of the reel gear 66 and the anchor gear 134 increases. In the modified embodiment, however, the braking mechanism is structured such that the clutch member 122 passes through the through hole 124 provided at the axial central portion of the reel hub 60, and the reel plate 128 has the through hole 128A. Therefore, the modified embodiment has no effect of increasing the area of the reel plate 128 at which the reel plate 128 is attracted by the magnet 104. (That is, since the magnet 104 itself has an annular shape, there is no merit of increasing the attracting area at the axial central portion of the reel plate 128.)

Note that, although the gate portions G are provided at the section where the reel gear 66 is to be formed in the above-described embodiments, the present invention is not limited to the structure. It suffices that the gate portions G are positioned at the radial direction outer side of the reel plate 70 or 128. Further, the present invention is not limited to the structure in which a plurality of gate portions G is provided at places which are spaced apart uniformly. Namely, for example, a single gate portion G may be provided. Alternatively, a plurality of gate portions G may be non-uniformly spaced on a circumference (or may be arranged like the anchor projections 72), or the gate portions G may be positioned at different distances from the axial center of the floor portion 60B.

In the above-described embodiments, the reel plate 70 or 128 is attached firmly to the floor portion 60B by insert molding. However, the present invention is not limited to the same. The reel plate 70 or 128 may be welded to the floor portion 60B by caulking. In this case, because the gate portions G are arranged so as to not interfere with the reel plate 70 and the like, even if the gate scar remain projecting, they have no effect on the profile accuracy of the reel plate 70 and the like.

Further, in the above-described embodiment, the recording tape cartridge 10 includes the opening 20 formed at a corner of the case 12, the door 50 which opens and closes the opening 20, and the leader pin 22, which serves as a leader mender provided at an end of the magnetic tape T. However, the present invention is not limited by the structure of the case 12, the opening and closing structure of the opening from which the tape is pulled out, or the structure of the leader member. Accordingly, for example, a structure is possible in which an opening provided at a front or side surface of the case 12 is closed by a door sliding straight to close the opening or a door moving along a hinge axis. Further, a structure in which the leader block, serving as a leader member, closes the opening is also possible. A leader tape which can be taken up onto the reel may also be used as a leader member. Further, the present invention is not limited by the structure of the braking mechanism that prevents rotation of the reel 14, 120 at the time when the recording tape cartridge 10 is not in use. Thus, braking mechanisms of various structures may be employed.

In the above-described embodiment, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, in the recording tape cartridge relating to the present invention, the effect of the gate portion to the metal plate which is attached firmly to the reel hub can be suppressed.

What is claimed is:

1. A recording tape cartridge which can be loaded into a drive device comprising a reel on which a recording tape is wound and which is rotatably accommodated in a case, the reel comprising:
   a resin-formed main portion which includes a reel hub formed in a tubular shape having a floor portion, the recording tape being wound around an outer peripheral surface of the reel hub; and
   a substantially disc-shaped metal plate attached firmly to an outer surface of the floor portion of the reel hub,
   wherein a gate portion, through which a resin material is introduced at the time of molding the main portion, is provided at a radial direction outer side of the metal plate.

2. The recording tape cartridge of claim 1, wherein the metal plate is attached firmly to the main portion by insert molding.

3. The recording tape cartridge of claim 1, wherein a plurality of gate portions is provided.

4. The recording tape cartridge of claim 3, wherein the gate portions are positioned at even intervals on a predetermined circumference which is coaxial with the reel hub.

5. The recording tape cartridge of claim 1, wherein the reel further includes an annular reel gear, which is formed on an outer side of the metal plate at the outer surface of the floor portion of the reel hub and which can mesh with a driving gear of the drive device, and wherein the gate portion is provided at the region where the reel gear is formed.

6. The recording tape cartridge of claim 1, further comprising a braking mechanism, which prevents rotation of the reel with respect to the case when the recording tape cartridge is not in use.

7. The recording tape cartridge of claim 6, wherein the braking mechanism includes a braking member, which has a braking gear that can mesh with gear teeth of the reel, and due to the meshing of the gear teeth and the braking gear, the rotation of the reel is prevented.

8. The recording tape cartridge of claim 6, wherein the braking mechanism includes a clutch member, which can move an axial central portion of the reel in a thickness direction of the case.

9. A reel around which a recording tape is wound, the reel comprising:
   a resin-formed reel hub formed in a tubular shape having a floor portion, the recording tape being wound around an outer peripheral surface of the reel hub;
   a lower flange having a diameter larger than that of the reel hub, the lower flange being provided integrally with the floor portion of the reel hub and forming a main portion of the reel;
   an upper flange having a diameter substantially equal to that of the lower flange, the upper flange being provided at a top end portion, opposite to the floor portion, of the reel hub; and
   a substantially disc-shaped metal plate attached firmly to an outer surface of the floor portion of the reel hub,
   wherein a gate portion, through which a resin material is introduced at the time of molding the main portion, is provided at a radial direction outer side of the metal plate.

10. The reel of claim 9, wherein the metal plate is attached firmly to the main portion by insert molding.

11. The reel of claim 9, wherein a plurality of gate portions is provided.

12. The reel of claim 11, wherein the gate portions are positioned at even intervals on a predetermined circumference which is coaxial with the reel hub.

13. The reel of claim 9, further comprising an annular reel gear, which is formed on the outer side of the metal plate at the outer surface of the floor portion of the reel hub and which can mesh with a driving gear of a drive device, wherein the gate portion is provided at a section where the reel gear is formed.

* * * * *